(12) United States Patent
MacHardy et al.

(10) Patent No.: US 7,574,560 B2
(45) Date of Patent: Aug. 11, 2009

(54) METHODS, SYSTEMS, AND COMPUTER PROGRAM PRODUCTS FOR DYNAMIC MAPPING OF LOGICAL UNITS IN A REDUNDANT ARRAY OF INEXPENSIVE DISKS (RAID) ENVIRONMENT

(75) Inventors: Earle MacHardy, Durham, NC (US); David Harvey, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 310 days.

(21) Appl. No.: 11/324,553

(22) Filed: Jan. 3, 2006

(65) Prior Publication Data
US 2007/0156957 A1 Jul. 5, 2007

(51) Int. Cl.
*G06F 13/00* (2006.01)
*G06F 13/28* (2006.01)

(52) U.S. Cl. .................................................... 711/114
(58) Field of Classification Search ................. 711/114
See application file for complete search history.

(56) References Cited

U.S. PATENT DOCUMENTS

| | | | |
|---|---|---|---|
| 5,574,855 A | 11/1996 | Rosich et al. | |
| 5,822,780 A | 10/1998 | Schutzman | |
| 6,507,890 B1 | 1/2003 | Morley et al. | |
| 6,578,160 B1 | 6/2003 | MacHardy, Jr. et al. | |
| 6,594,775 B1 | 7/2003 | Fair | |
| 6,640,233 B1* | 10/2003 | Lewis et al. | 707/205 |
| 6,678,788 B1 | 1/2004 | O'Connell | |
| 6,691,209 B1 | 2/2004 | O'Connell | |
| 6,718,481 B1 | 4/2004 | Fair | |
| 6,813,623 B2 | 11/2004 | Wilding et al. | |
| 6,865,157 B1 | 3/2005 | Scott et al. | |
| 6,944,133 B2 | 9/2005 | Wisner et al. | |
| 2002/0161983 A1* | 10/2002 | Milos et al. | 711/202 |
| 2004/0153710 A1 | 8/2004 | Fair | |
| 2004/0153749 A1 | 8/2004 | Schwarm et al. | |
| 2004/0225855 A1 | 11/2004 | Branch | |
| 2005/0091455 A1 | 4/2005 | Kano et al. | |
| 2006/0184587 A1* | 8/2006 | Federwisch et al. | 707/200 |

OTHER PUBLICATIONS

Poelker, Christopher, RAID Explained, Dec. 2005, http://expertanswercenter.techtarget.com/eac/knowledgebaseAnswer/0,295199,sid63_gci1142833,00.html.*
Notification of Transmittal of the International Search Report and the Written Opinion of the International Searching Authority, or the Declaration for International Application No. PCT/US2007/000165 (May 7, 2007).
Shinkai et al., "HAMFS File System," IEEE, pp. 190-201 (Oct. 19, 1999).

* cited by examiner

*Primary Examiner*—Matt Kim
*Assistant Examiner*—Edward J Dudek
(74) *Attorney, Agent, or Firm*—Jenkins, Wilson, Taylor & Hunt, P.A.

(57) ABSTRACT

Disclosed are methods, systems, and computer program products for dynamic mapping of logical unit (LUN) storage extents in a redundant array of inexpensive disks (RAID) environment. According to one method, a data storage extent pool representing at least a portion of a RAID array and including at least one data storage extent is provisioned. A first mapped logic unit (MLU) for allocating data storage extents from the data storage extent pool is created. A first data storage extent is allocated, using the first MLU, in response to a data write operation.

51 Claims, 17 Drawing Sheets

METHODS, SYSTEMS, AND COMPUTER PROGRAM PRODUCTS FOR DYNAMIC MAPPING OF LOGICAL UNITS IN A REDUNDANT ARRAY OF INEXPENSIVE DISKS (RAID) ENVIRONMENT

TECHNICAL FIELD

The subject matter described herein relates to logical unit (LUN) mapping of memory arrays. More particularly, the subject matter described herein relates to methods, systems, and computer program products for dynamic mapping of logical units in a redundant array of inexpensive disks (RAID) environment.

BACKGROUND

RAID groups are logical representations of disk arrays created by binding individual physical disks together to form the RAID groups. RAID groups represent a logically contiguous address space distributed across a set of physical disks. Each physical disk is subdivided into pieces used to spread the address space of the RAID group across the group (along with parity information if applicable to the RAID level). The physically contiguous pieces of the physical disks that are joined together to create the logically contiguous address space of the RAID group are called stripes.

Applications access and store data incrementally by use of logical storage array partitions, known as logical units (LUNs). LUNs are exported from a RAID array for use at the application level. For traditional systems, LUNs always map to physically provisioned contiguous storage space. This physical provisioning results from the fact that traditional LUN mapping technologies bind LUNs from RAID groups using static mapping. Static mapping provides that a LUN is defined by a start position in a RAID group and that the LUN extends for its size from that position contiguously in the RAID group's address space. This static mapping yields a logical unit mapping of 1:1 for logical to physical mapping of blocks from some start point in the RAID group's address space on the array.

Because this mapping was simple, it was viewed as the most efficient way to represent a logical unit in any system from the point of view of raw input/output (I/O) performance. The persistent definition of the logical unit as a contiguously provisioned unit made it manageable for storage and retrieval, but imposed limits the scalability of data storage systems.

However, while the persistent nature of the LUN defined in this manner has been manageable for storage and retrieval, it has become inefficient with the increased usage of layered applications. Layered applications may be characterized by an environment where different versions of data must be maintained and moved around a system quickly and in a transparent manner. Control of the placement of data has become more important. The ability to quickly and efficiently represent different versions of a LUN is also starting to become a more important factor to optimize due to customer needs for quick data recovery after system failures.

As well, there is no provision for sharing of data segments on the array in traditional systems. Snapshots are often used in storage systems to identify changes in the storage contents over time. When snapshots are used for point-in-time copies, LUNs are copied in their entirety along with a set of changes that describe the original structure of the LUN, either from its creation or from the last snapshot. In order to preserve the original structure of the logical unit for that point in time, blocks are copied on the first write reference (copy on first write) to a special save area reserved to hold these "historical" blocks of data. This copy involves a read/write cycle that causes significant performance disruption just after the point in time copy is created against an actively changing production logical unit. The disruption may continue for some amount of time until most of the copying is completed and sometimes this can last for hours. In an array environment where snapshots are constantly being created, the performance impacts of traditional systems become significant.

Accordingly, in light of these difficulties associated with conventional RAID array LUN provisioning, there exists a need for improved methods, systems, and computer program products for dynamic mapping of logical units in a RAID environment.

SUMMARY

According to one aspect, the subject matter described herein comprises methods, systems, and computer program products for dynamic mapping of logical unit (LUN) storage extents in a redundant array of inexpensive disks (RAID) environment. One method includes provisioning a data storage extent pool representing at least a portion of a RAID array and including at least one data storage extent, creating a first mapped logic unit (MLU) for allocating data storage extents from the data storage extent pool, and in response to a data write operation, allocating, using the first MLU, a first data storage extent from the data storage extent pool.

The subject matter described herein providing dynamic mapping of logical unit (LUN) storage extents in a redundant array of inexpensive disks (RAID) environment may be implemented using a computer program product comprising computer executable instructions embodied in a computer-readable medium. Exemplary computer-readable media suitable for implementing the subject matter described herein include disk memory devices, programmable logic devices, and application specific integrated circuits. In addition, a computer-readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
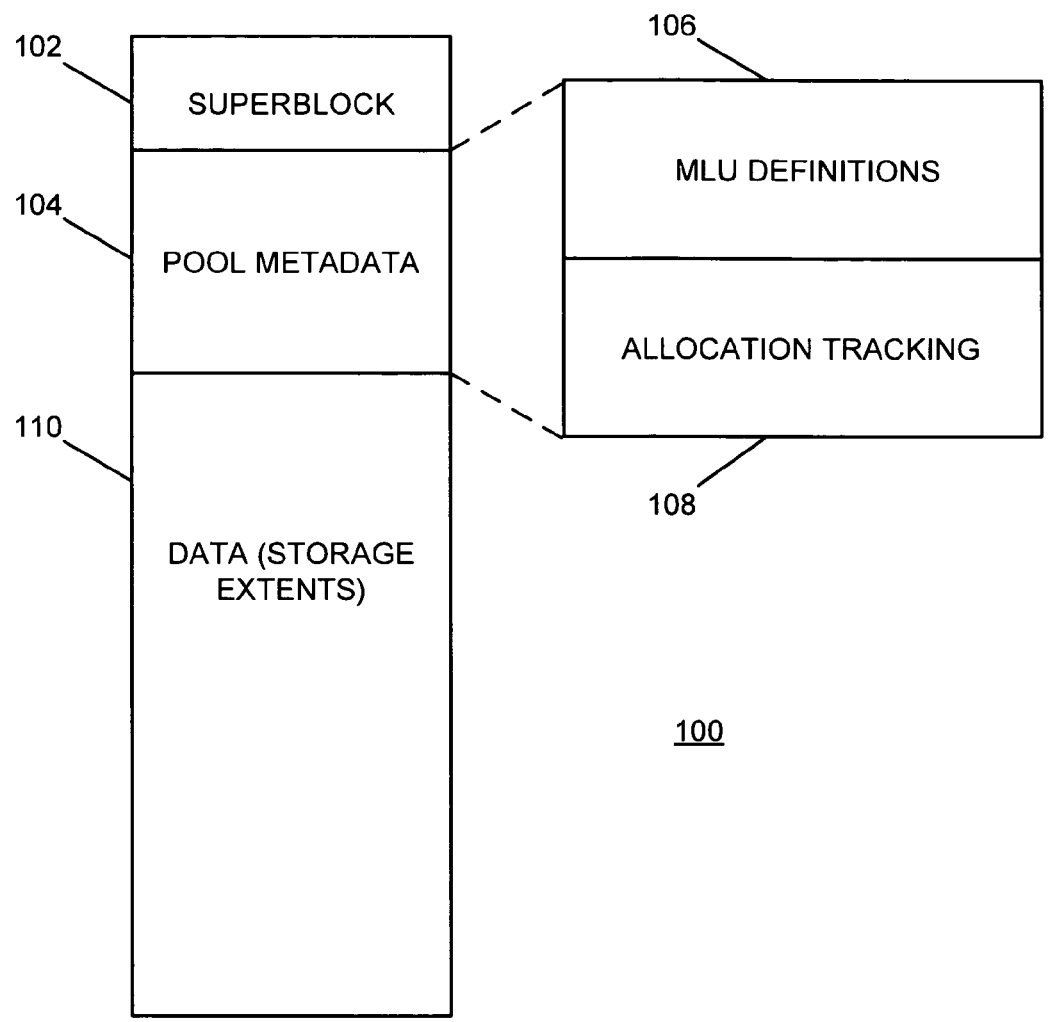
FIG. 1 is a block diagram of an exemplary storage extent pool according to an embodiment of the subject matter described herein.

In view of the problems described above with respect to static provisioning of LUNs in RAID arrays, the subject matter described herein allows dynamic provisioning with mapping of LUNs in RAID arrays. Where previously LUNs were statically mapped to specific regions of a RAID array, the methods, systems, and computer program products described herein dynamically map LUNs to a RAID array. By adapting the definition and data allocation of a LUN, as described herein, storage capacity and performance improvements may be realized.

In order to facilitate these storage capacity and performance improvements, a flexible address space mapping will be presented herein. The mapping allows for physically non-contiguous storage chunks to be dynamically linked together at a time of use into a logically contiguous address space.

These dynamically provisioned storage chunks are referred to herein as storage extents. Storage extents may be allocated as needed from a provisioned data extent storage pool. This pool may be a repository of storage extents that are available for dynamic allocation (e.g., dynamic provisioning). This pool may have properties much like a RAID group with storage extent granularity ranging from as small as two kilobytes per storage extent, for example, to a potential maximum, within a given pool, of the pool size minus overhead (pool size—overhead). Storage extents may be assigned from either contiguous or non-contiguous portions of a pool. However, based upon the description below, even discontinuous groupings may be represented as a logically contiguous address space. A default storage extent of 64 kb and a pool size of one terabyte will be used herein for simplicity of description. A disk array may have many different pools just as it may have many different RAID groups.

This pool overhead is referred to herein as pool metadata. The storage extents within the physical storage pool may be tracked by metadata data structures stored within the pool itself. While storage of the metadata within the pool is not a requirement, it serves a useful purpose of compartmentalizing the pool and its overhead. This compartmentalization may be helpful, for example, for scalability and for use in failure mode recovery. This metadata may take any form suitable for tracking allocation and ownership of the data extents.

A construct called a mapped logic unit (MLU) is used to allocate a data storage extent from a pool. An MLU has both behavioral capabilities for allocation of data storage extents from the pool and data structure and storage extent pointer manipulation capabilities for managing allocated data storage extents. An MLU may interface between an application and a pool of data storage extents to create a virtual address space for use by the application. This virtual address space may be allocated in an on-demand fashion when data is written by an application to the address space represented by the MLU. An MLU may be thought of as a replacement for the traditional LUN concept.

The MLU includes a reference to an address space mapping used to allow a dynamic, logically contiguous, but potentially physically non-contiguous, view of the RAID array's address space. In one exemplary implementation, an MLU may include a pointer construct storing a plurality of pointers to different data storage extents to which data has been written by an application. When an MLU is first allocated and associated with an application, it may be assigned a pool from which to draw storage extents. For ease of explanation, the description herein will consider an MLU to be capable of allocating storage space from one pool. However, an MLU may be capable of allocating storage space from multiple pools without departing from the scope of the subject matter described herein. An initial MLU definition may include a maximum size, or number of storage extents, that may be allocated by the MLU.

Pools, as collections of storage extents, may be thought of as aggregated logical units (ALUs). Pools may also be thought of as collections of ALUs, thereby providing variable granularity within the pool construct. By adding or removing ALUs from a pool, the pool may be increased or decreased over time, respectively, based upon system needs. By allowing variable granularity across a pool, storage extent size allocations may also be varied. Logical storage allocations may be created with a specified storage extent size that either matches, or is a multiple of, the minimum storage extent available within a pool. This variable allocation may be managed within the pool metadata so that MLU design may be simplified by allowing MLUs to view aggregated allocations as single storage extents. For simplicity, it will be assumed that an aggregated storage allocation is internally contiguous, though further abstractions of the concepts disclosed herein are possible and all are considered within the scope of the subject matter described herein.

As data extents are allocated by an MLU to its address space, allocation tracking information may be maintained at both the pool level and at the MLU level. Information relating to which MLUs have been created and which storage extents (or aggregations) have been allocated to each MLU may be stored as pool metadata. Thereby, storage extents may initially be sequentially allocated from the pool, and later allocated from discontiguous space as MLU storage extents are returned to the pool. It should be noted that defragmentation processes may be performed on a pool occasionally to allow alignment of storage extents and may be performed as a background operation, as will be described in more detail below.

MLU internal allocation tracking information is referred to herein as MLU metadata and, much like the pool metadata, may be stored within the MLU or may be stored in a separate set of data structures. The ordering of potentially discontinuous storage extents to form a logically contiguous address space within an MLU may be indexed within the MLU metadata. By storing this indexing within the MLU metadata (and, thereby, within the pool) it may be shared with other MLUs. By tracking alignment within the MLU metadata, this tracking may be partitioned from the pool metadata. By encapsulating alignment tracking as MLU metadata, MLUs may be more easily copied and referenced externally, as will be described in more detail below.

MLU metadata may be physically stored within data extents within the pool to aid in performance enhancement and recovery procedures or may be stored in another storage area. When stored within the pool, the MLU definitions may become part of the pool metadata. Again, as with pool metadata, storing MLU metadata within the pool may provide scalability enhancements.

Because there is no storage allocated to an MLU when it is created, the initial mapping of an MLU for a read operation may return zeros for any sectors that are read from its address space. When a write is performed to the MLU address space, a new storage extent may be allocated from the pool and assigned to the MLU. In the absence of any sharing of this storage extent, further writes to this area of the address space may use the existing storage extent to hold the new data. When sharing of storage extents exists, as will be described in more detail below, a new storage extent may be allocated for storage of new data when either sharing MLU receives a data write to the shared logical address space.

By allocating the storage extents on first write (e.g., allocate on first write), MLU physical storage space may be dynamically expanded or provisioned. When a storage extent is allocated by an MLU, the mapping associated with the MLU, both internally within MLU metadata and externally within pool metadata, may also be updated to reflect the allocation.

By using an allocate-on-first-write mechanism, an MLU may only contain enough storage extents to represent all data written by the user since the logical unit was created. This address space property may be termed sparseness. Sparseness means that parts of the mapping that do not specify a storage extent will, as described above, return a fixed value for that part of the address space, which for example, may be all zeros. This sparse property of the address space means that storage usage may be efficient with respect to the amount of data represented in the MLU because large sections of unwritten space (e.g., no data) in the MLU do not consume any space at all. Unlike traditional systems that provision all data storage for each application, MLUs may grow as applications write data to storage.

As described above, MLUs may be created with a maximum size, or number of storage extents, that may be allocated by the MLU. Pools may reserve the full number of storage extents available for an MLU when an MLU is created. In this way, by use of this full sparse provisioning, each MLU may be guaranteed to have the capacity and dimensionality available to it that was specified when it was created.

However, some applications may desire certain storage dimensions and never use the entire space. This inefficiency of storage referencing at the application level may be accommodated within the pool allocation mechanisms through a concept of thin sparse provisioning. Thin sparse provisioning may be allowed by a system administrator for any MLUs associated with an application when the administrator knows, or believes, that the application actually uses less storage than it desires. By reserving fewer than the maximum number of storage extents specified when an MLU was created, application storage use inefficiency may be improved at the MLU and pool levels without awareness of this thin sparse provisioning at the application level. In the event that an application actually desires to write to more space than was thinly provisioned for the MLU, extra storage extents may be allocated from the pool, if any exist, and an alert may be issued to the administrator who may then increase the pool size or the level of thin sparse provisioning for MLUs associated with this type of application.

Another benefit of the allocate-on-first-write mechanism relates to the fact that the MLU storage is built on demand. Because MLU storage is built on demand and returns a zero value for any read from unallocated storage, there is no need to zero unused storage space within the MLU. This is more efficient than other techniques of storage initialization, such as, for example, a technique known as fast binding which zero's storage areas as a background task. Accordingly, binding of MLU storage may be done on the fly in a real-time fashion without additional processor overhead or data write operations.

FIG. 1 illustrates an exemplary storage extent pool 100 depicting metadata storage extents and allocable storage extents. Superblock area 102 may be a controlling structure that describes the pool format. For example, superblock area 102 may contain information related to the chosen storage extent size as well as any ALU type aggregations that may be used within the pool. Pool metadata area 104 may store pool overhead data and data structures. As described above, pool metadata area 104 may be further broken down into MLU definition area 106 and allocation tracking area 108. Data storage extent pool 110 includes indexed allocable storage extents for allocation by MLUs. Data storage pool 110 may also optionally include the MLU metadata.

MLU definition area 106 may include, for example, MLU definitions that include storage extent pointers to MLUs that have been defined within data storage pool 110. When defined in this way, MLU metadata and MLU storage extent allocation sequence tracking information may be stored in the pool with the MLU. As an alternative, MLU definition area 106 may include MLU metadata storage and MLU storage extent allocation sequence tracking information in addition to the actual MLU definitions. Allocation tracking area 108 may include, for example, identifiers and related information for MLUs defined and storage extents allocated within the pool. Allocation tracking structures may be used within allocation tracking area 108 to store allocation information related to the allocation state of the storage extents in the pool. Allocation tracking area 108 may also include information related to how many MLUs reference a given block of storage.

For recovery purposes, pools may have three basic states: consistent, defragmenting, and inconsistent. A consistent pool may be considered available for allocation operations for the MLUs that are supported in that pool. A defragmenting pool may be available for use, but some blocks in the pool may be in the process of being rearranged, so the total pool capacity may register somewhat less than what would otherwise be available. An inconsistent pool is not available for allocation usage until it has transitioned into the consistent state. Absent hardware failure, pools may always be returned to a consistent state regardless of the current state of its inconsistency. Verification procedures may be run against a pool periodically to ensure the pool is in a consistent state and ready for use. Verification procedures may be run concurrently with normal operation in order to keep the pool online.

Tracking structures within allocation tracking area 108 may allow for storage extents to be shared from the pool by multiple MLUs. As will be described in more detail below, point-in-time copy storage may be greatly enhanced by tracking structures that allow storage extent references to be shared.

Two variations of allocation tracking will be described herein to allow sharing of storage extents by multiple MLUs. The variation chosen may be determined by the amount of memory and the amount of paging that is desired for a given system. Systems of moderate size and granularity, for example, up to eight terabytes with a granularity of two kilobytes per storage extent, may use a counter-based model. An owner-based model may be used for larger, more granular systems that surpass the threshold of either size or granularity. The counter-based model, which may be used in systems of moderate size and granularity, will use an allocation count field associated with each storage extent to track allocation of the storage extents to more than one MLU. The owner-based model, which may be used in large, highly granular systems, will use an allocation bitmap paired with an ownership bit within pointer structures of the MLUs to track allocation of the storage extents to more than one MLU. The ownership bit may be used to indicate which MLU "owns" a given allocated storage extent. The use of a bitmap in conjunction with an ownership bit may conserve space over use of the allocation count field variation for large, highly granular systems. Both variations will be described in more detail below.

Figure 2A:
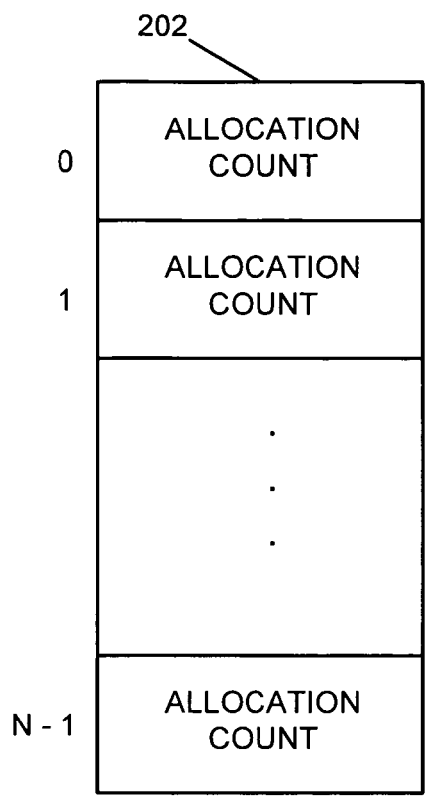
FIG. 2A is a block diagram of an exemplary dynamic allocation tracking structure for tracking dynamically allocated storage extents (blocks) within a storage extent pool for use in systems of moderate size and granularity according to an embodiment of the subject matter described herein.

FIG. 2A illustrates an exemplary dynamic allocation tracking structure 200 for tracking dynamically allocated storage extents (blocks) within a storage extent pool that may be used in systems of moderate size and granularity. Allocation tracking structure 200 may be stored in allocation tracking area 108 of storage extent pool 100. Allocation tracking structure 200 may include an array of allocation tracking units, each including an allocation count field 202. Allocation tracking structure 200 may map the blocks within a data pool, such as data storage pool 110 illustrated in FIG. 1, for allocation tracking. The allocation count field 202 associated with each storage extent may be incremented for each allocation and decremented for each deallocation, thereby allowing tracking of the number of MLUs that reference each storage extent. For example, as will be described in more detail below, when a copy of an MLU is made, the associated allocation count field 202 for all referenced blocks may be increased. Likewise, when an MLU is deleted, the associated MLU allocation count field 202 for all referenced blocks may be decreased. As another example, when a single block is allocated or deallocated by an MLU, the associated allocation count field 202 for the block may be increased or decreased, respectively. Initially, all allocation count fields 202 may be set to zero (0).

Figure 2B:
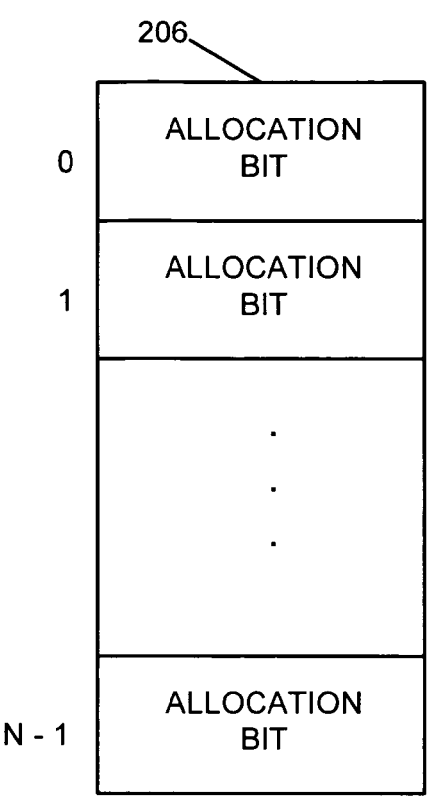
FIG. 2B is a block diagram of an exemplary dynamic allocation tracking bitmap for tracking dynamically allocated storage extents (blocks) within a storage extent pool for large, highly granular systems according to an embodiment of the subject matter described herein.

FIG. 2B illustrates an exemplary dynamic allocation tracking bitmap 204 for tracking dynamically allocated storage extents (blocks) within a storage extent pool that may be used in large, highly granular systems. Allocation tracking bitmap 204 may be stored in allocation tracking area 108 of storage extent pool 100. Allocation tracking bitmap 204 may include an array of allocation tracking units, each including an allocation bit field 206. Allocation tracking bitmap 204 may map the blocks within a data pool, such as data storage pool 110 illustrated in FIG. 1, for allocation tracking. As will be described in more detail below, the allocation bit field 206 associated with each storage extent may be set for each allocation. When used in conjunction with an ownership bit within the MLUs, as will be described in more detail below, tracking of the MLUs that reference each storage extent may be accomplished.

Figure 2C:
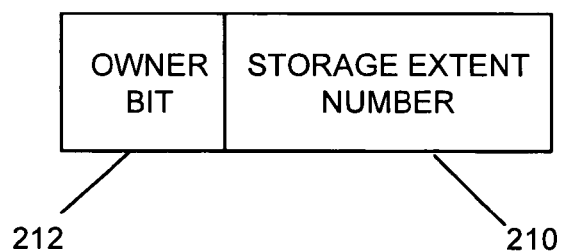
FIG. 2C illustrates an exemplary dynamic allocation tracking storage extent numbering structure for use in conjunction with an allocation tracking bitmap, such as the dynamic allocation trackirig bitmap of FIG. 2B, for tracking dynamically allocated storage extents (blocks) within a storage extent pool for use in large, highly granular systems according to an embodiment of the subject matter described herein.

FIG. 2C illustrates an exemplary dynamic allocation tracking storage extent numbering structure 208 for use in conjunction with an allocation tracking bitmap, such as dynamic allocation tracking bitmap 204, for tracking dynamically allocated storage extents (blocks) within a storage extent pool that may be used in large, highly granular systems. When used in conjunction with dynamic allocation tracking bitmap 204, dynamic allocation tracking storage extent numbering structure 208 may track which MLU owns the referenced storage extent. A storage extent number field 210 may be used to reference the storage extents that make up the pool. An owner bit field 212 may be used and the bit set when an MLU that includes dynamic allocation tracking storage extent numbering structure 208 is the owner of the storage extent referenced within the storage extent number field 210. For example, when an MLU initially allocates a block, ownership may be assigned to that MLU and the owner bit field 212 set to indicate ownership. When an MLU is copied, the ownership of the blocks may or may not be changed, depending upon subsequent activities, as will be described in more detail below.

Dynamic allocation tracking storage extent numbering structure 208 may be embodied, for example, within an address-type field where the highest order bit is the owner bit field 212 and the remaining bits are the storage extent number field 210. For example, with a bit field width of sixty four bits, a storage extent number field 210 of sixty three bits is possible with the highest order bit representing owner bit field 212. For ease of description herein, owner bit field 212 and storage extent number field 210 will be shown as a colon-separated numeric pair. For example, a pairing that designates ownership of storage extent three (3) will be described herein with owner bit field 212 set to a one (1) and storage extent number field 210 set to three (3) (e.g., 1:3). Likewise, a pairing that designates no ownership of storage extent three (3) will be described herein with owner bit field 212 set to a zero (0) and storage extent number field 210 set to three (3) (e.g., 0:3).

Figure 3:
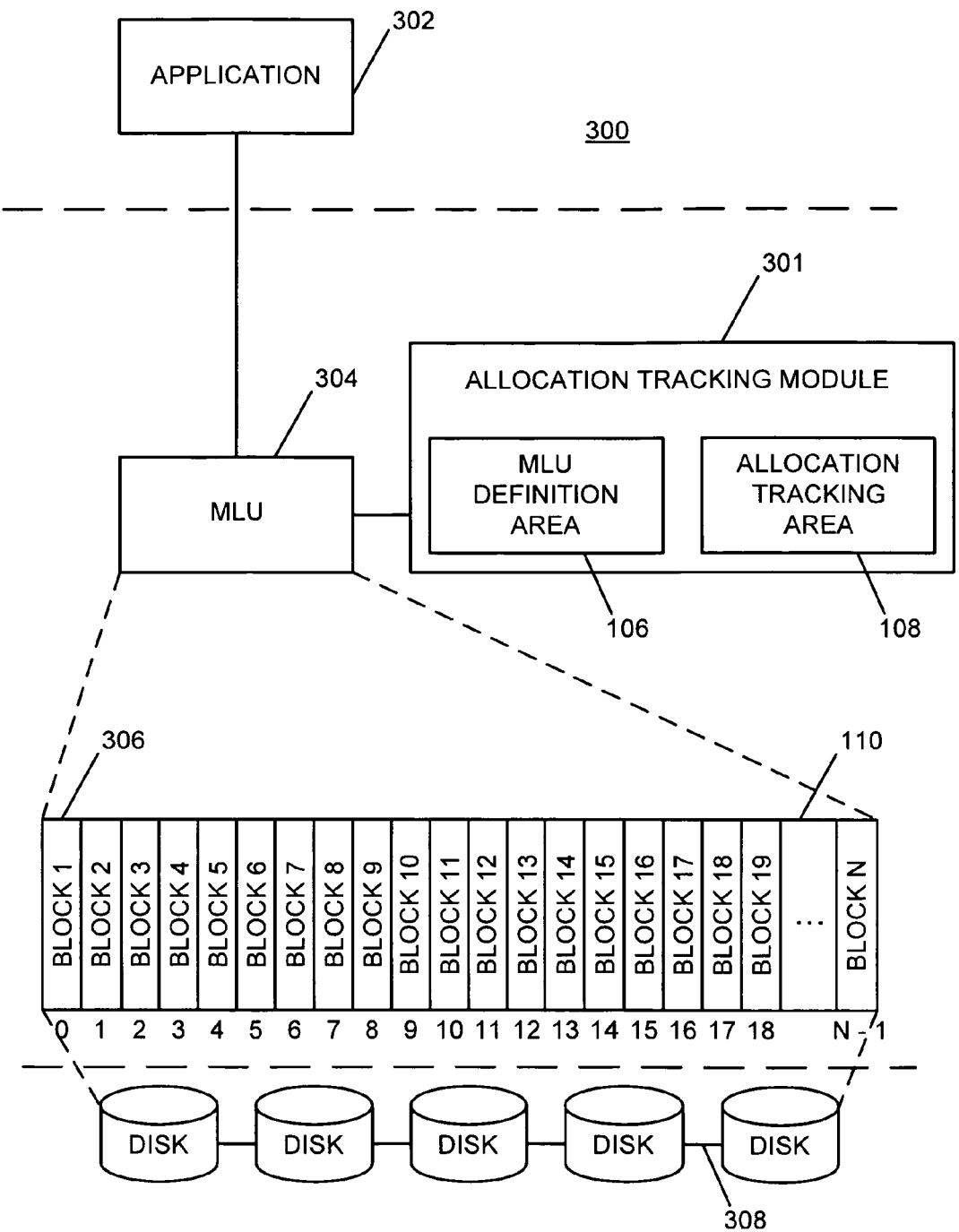
FIG. 3 is a block diagram of an exemplary dynamic allocation system for dynamically allocating storage extents from a data storage extent pool according to an embodiment of the subject matter described herein.

FIG. 3 illustrates an exemplary dynamic allocation system 300 for dynamically allocating storage extents from a data storage extent pool. Allocation tracking module 301 tracks system-level information related to allocation of storage extents, as will be described in more detail below. MLU definition information is stored within MLU definition area 106 and higher-level storage extent allocation and tracking information is stored within allocation tracking area 108. As described above and in more detail below, the contents of allocation tracking area 108 may vary depending upon the size and granularity of dynamic allocation system 300. MLU creation, storage extent allocation and de-allocation, and MLU deletion are tracked by allocation tracking module 301. Storage extent allocation and de-allocation are communicated to allocation tracking module 301 by MLU 304 to allow allocation tracking module 301 to perform higher-level operations related to data storage pool 110.

Application 302 is served by MLU 304. MLU 304 interfaces between application 302 and data storage pool 110 and provides a virtual address map of storage space for application 302. Application 302 may be any suitable application that reads data from and writes data to physical storage. In one exemplary implementation, application 302 may be a file server.

As will be described in more detail below, when application 302 performs a read operation from a portion of its virtual address range prior to allocation of a storage extent for the respective portion of the address space, MLU 304 may return zeros to application 302. When application 302 performs a write operation to a portion of its virtual address range, MLU 304 may allocate storage extents from data storage pool 110 on demand to occupy the respective portions of the virtual address space represented within MLU 304 and targeted by the write operation. MLU 304 may allocate storage extents (blocks) 306 from data storage pool 110 when needed by application 302 for data storage.

Data storage pool 110 represents a logically contiguous view of a portion of a physical RAID array 308, and as such, provides a mapping of storage extents 306 onto RAID array 308. For simplification, data storage pool 110 is illustrated as a logical layer that resides adjacent to RAID array 308, which may include physical disks. However, it is understood that one or more logical layers, such as aggregations of pools 110 and RIAD groups, may reside between data storage pool 110 and the physical disks that make up RAID array 308 without departing from the scope of the subject matter described herein. As described above, RAID array 308 may also store allocation tracking area 108 and MLU definition area 106, and each storage extent 306 may represent a logically contiguous portion of RAID array 308 of a chosen granularity. MLU 304 and allocation tracking module 301 comprise kernel-space software/firmware including both behavioral and data management aspects. An exemplary hardware platform on which dynamic allocation system 300 may be implemented is the CLARiiON® platform available from EMC Corporation of Hopkinton, Mass.

Figure 4A:
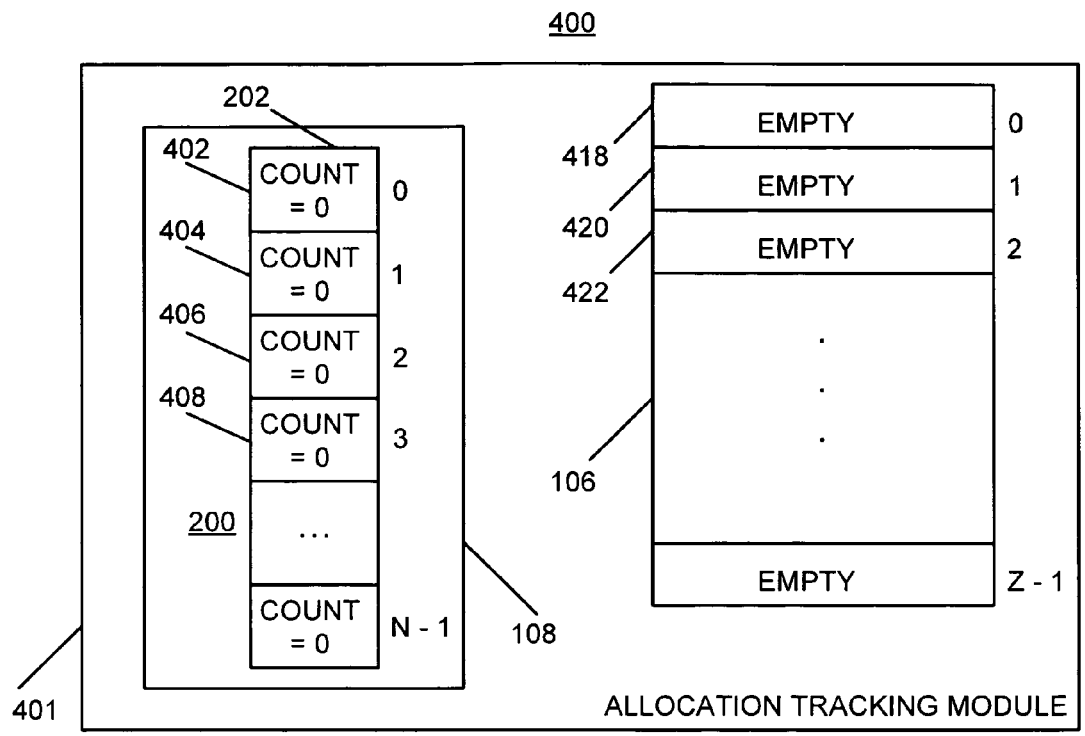
FIG. 4A is a block diagram of an exemplary dynamic allocation system of moderate size and granularity for dynamically allocating storage extents from a storage extent pool in an initial state prior to creation of any MLUs and wherein no blocks have been allocated and tracking structures are not yet occupied according to an embodiment of the subject matter described herein.
Figure 4A:
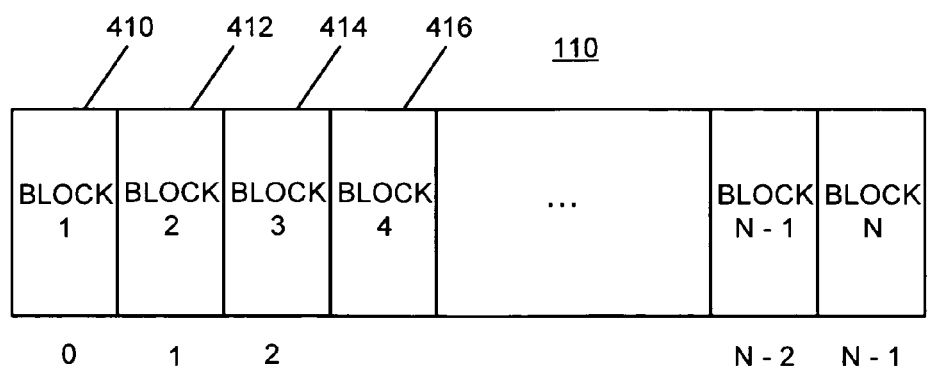

FIGS. 4A-4D illustrate exemplary dynamic allocation system 400 of moderate size and granularity for dynamically allocating storage extents from a storage extent pool. Exemplary dynamic allocation system 400 is based upon exemplary dynamic allocation system 300 for the case of moderate size and granularity. FIG. 4A depicts an initial state for this system, wherein, prior to creation of any MLUs, no blocks have been allocated and the tracking structures are not yet occupied with active data. Allocation tracking module 401, is based upon allocation tracking module 301 with data structures, as described above and in more detail below, for a system of moderate size and granularity. Allocation tracking module 401 references allocation tracking area 108, including an allocation tracking structure 200, partitioned into N segments, indexed as zero (0) to N minus one (N−1). As can be seen from FIG. 4A, a column of allocation count fields 202 indicate that all storage extents in data storage pool 110 are free, as indicated by a count of zero in each allocation count field 202. The rows of allocation tracking structure 200 represent individual entries in the tracking structure. Rows 402, 404, 406 and 408 represent tracking structure entries, each of which includes an allocation count field 202.

Data storage pool 110 is represented with the same number N storage extents of equal size. For illustrative purposes, each storage extent will be considered to be 64K bytes in size (65,536 bytes of storage space). Storage extents 410, 412, 414 and 416 represent storage extents for blocks 1 through 4, respectively.

In FIG. 4A, MLU definition area 106 includes Z segments of MLU definition identifiers that may be used to identify MLUs when they are created. These identifiers may include attributes for identifying blocks (block pointers) within data storage pool 110. Again, the initial state of dynamic allocation system 400 has no MLUs defined. MLU definition entries 418, 420 and 422 represent the entries at indexes zero (0), one (1) and two (2) respectively.

Figure 4B:
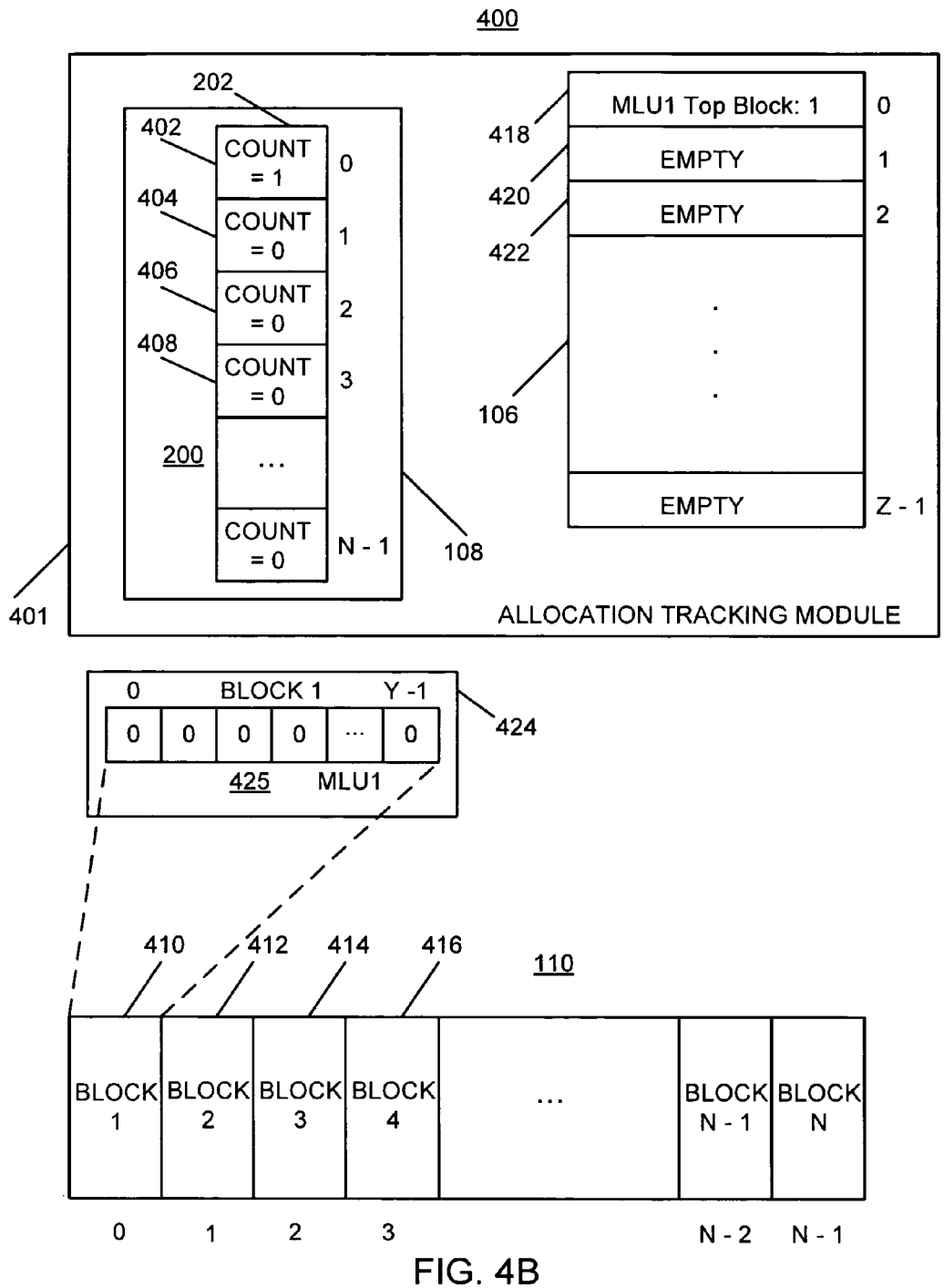
FIG. 4B is a block diagram of an exemplary dynamic allocation system of moderate size and granularity for dynamically allocating storage extents from a storage extent pool after one MLU has been created according to an embodiment of the subject matter described herein.

FIG. 4B illustrates dynamic allocation system 400 after one MLU has been created. MLU1 424 is shown registered in MLU definition entry 418. MLU definition entry 418 points to block 1 410 of data storage pool 110. Allocation tracking structure entry 402 has been modified to reflect that the count associated with this MLU definition is one (1) for this storage extent (block 1 410 at index zero of data storage pool 110).

MLU1 424 includes a storage pointer structure 425 stored in block 1 410 and representing the storage address range for MLU1 424. The entries within storage pointer structure 425 represent Y storage pointers that may be used to point to storage extents, indexed from zero (0) to Y minus one (Y–1). The pointers initially point to zero, indicating that reads from the MLU address range initially return a value of zero. In the illustrated example, the entries within pointer structure 425 that include non-zero values point to storage extents allocated by MLU 424. As described above, these storage extents may be allocated when an application performs a write operation. The maximum address range of the MLU may be represented by the number of pointers, Y, provided within the storage pointer structure 425 multiplied by the storage extent size that may be referenced by each pointer.

Each pointer within storage pointer structure 425 may point to other storage extents that may each include another storage pointer structure. This may continue until enough storage pointers may be referenced to fully occupy the desired address range for an application. Accordingly, a multi-layered storage pointer array system is possible, thereby allowing scalability of MLU address ranges, either at MLU creation or over time.

In order to determine whether a multi-layered storage pointer array should be used, the desired address space for the application should be divided by the size of the storage extents or ALUs to be allocated from within the pool to yield the number of storage extent pointers to be used. The number of storage extents that should be allocated for storage of the storage extent pointers may be determined by dividing the number of storage pointers by the number of storage pointers that may be stored in one storage extent to yield the number of storage extents to be used to store the pointers. The number of storage extent pointers that may be stored within a storage extent is a function of the storage extent size divided by the pointer size. When the number of storage pointers exceeds the capacity of one storage extent to hold them all, an additional number of storage extents may be used to create a multi-layered storage pointer array. For simplicity of description, only one layer is represented in FIGS. 4A-4D.

Figure 4C:
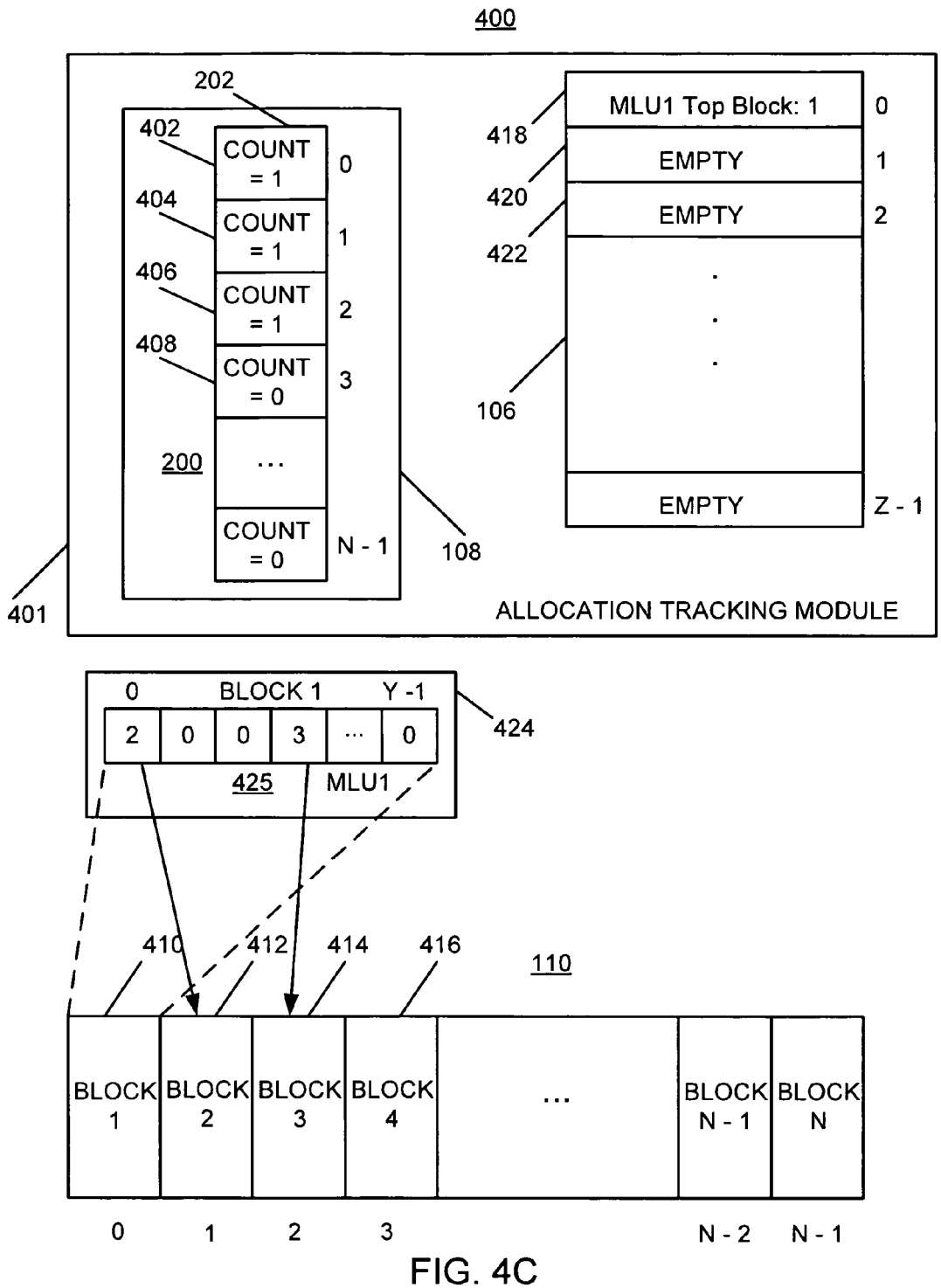
FIG. 4C is a block diagram of an exemplary dynamic allocation system of moderate size and granularity for dynamically allocating storage extents from a storage extent pool after two write request have been completed for a first MLU according to an embodiment of the subject matter described herein.

FIG. 4C illustrates dynamic allocation system 400 after two write request have been completed for MLU1 424. Recall that storage blocks may be allocated to the MLU when write requests are processed. For illustrative purposes and assuming byte addressability, the two write requests will be assumed to have been to the first and fourth 64K address segments of the address range addressable by MLU1 424 (e.g., byte ranges 0-65,535, and 196,608-262,143, respectively).

As can be seen from FIG. 4C, storage extent 412 (block 2) and 414 (block 3) of data pool 110 have been allocated for storage of the written data. The first and fourth storage pointers of storage pointer structure 425 have been updated to point to storage extent 412 (block 2) and 414 (block 3), respectively, and to reflect the write operation to those contiguous storage ranges of the MLU definition. However, the data was placed at logically non-contiguous address ranges in the data pool. The unwritten address ranges in the address range of the MLU have not been propagated to the storage medium. The unwritten address ranges have been effectively removed from the storage requirement. Read from the addresses that have been written will return data from the data pool locations referenced by the pointers, while reads from non-written areas will return zero values without requiring storage allocation for this logical consistency.

FIG. 4C also illustrates the updating of allocation tracking structure 200 to reflect the allocation of the two blocks from data pool 110. As can be seen from FIG. 4C, rows 404 and 406 have been updated by incrementing the respective allocation count fields 202 to one (1) to represent that the associated storage blocks are now in use by MLU1 424.

Figure 4D:
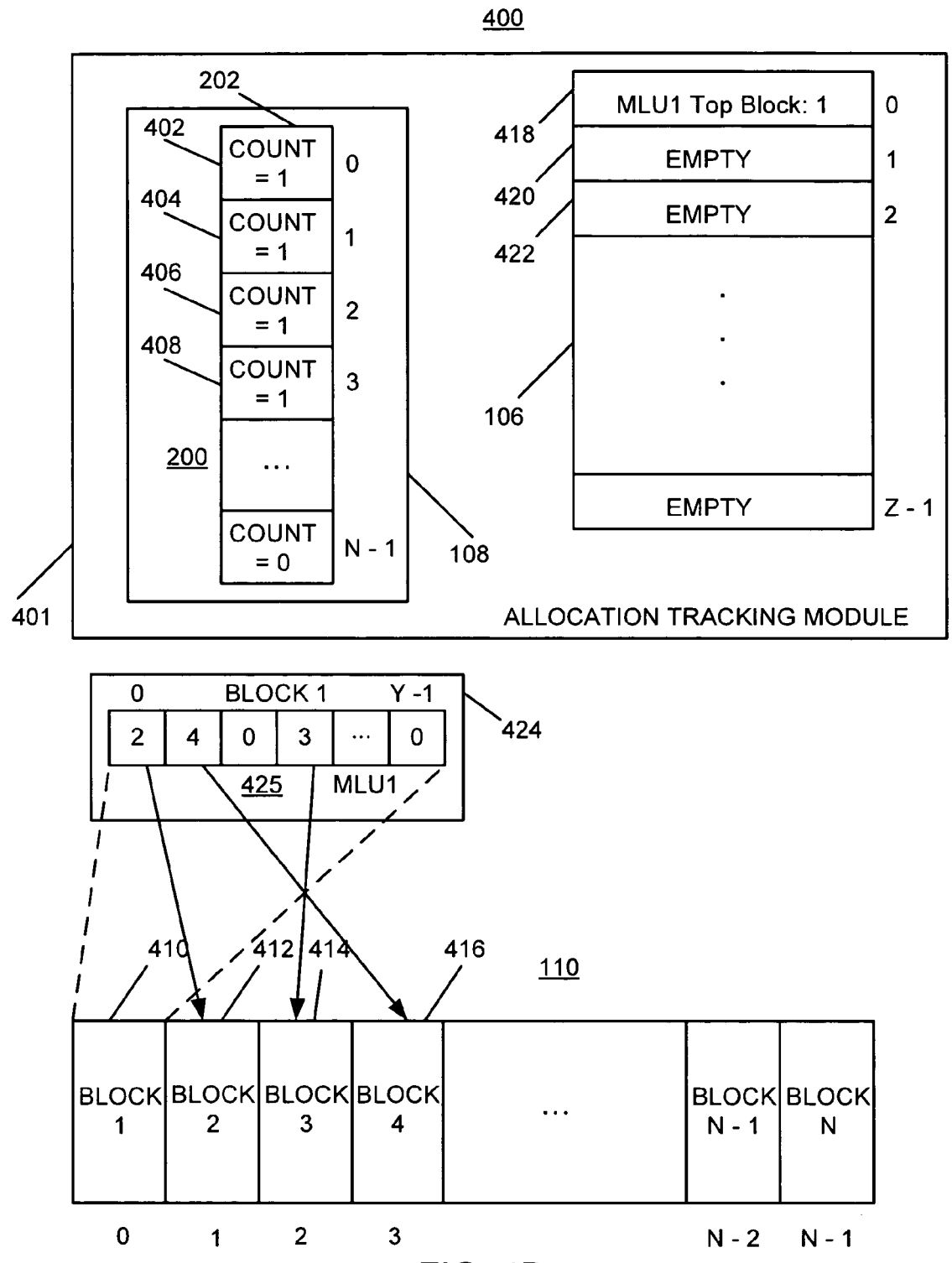
FIG. 4D is a block diagram of an exemplary dynamic allocation system of moderate size and granularity for dynamically allocating storage extents from a storage extent pool after a third write request has been completed for the first MLU to an interim address range within the MLU definition according to an embodiment of the subject matter described herein.

FIG. 4D illustrates dynamic allocation system 400 after a third write request has been completed for MLU1 424 to an interim address range within the MLU definition. FIG. 4D reflects a write to the second 64K address segment of the address range addressable by MLU1 424 (e.g., byte ranges 65,536-131071). This write request allocated block 416 (e.g., block 4 of the storage pool at index 3) to MLU1 424. This is reflected by the updated storage pointer for this region (e.g., the second pointer) of the address range in storage pointer structure 425 which now reflects that block 416 (block 4 of the array) has been written for this address range of MLU1 424. As can be seen from FIG. 4D, row 408 has been updated by incrementing the respective allocation count field 202 to one (1) to reflect that the associated storage block is now in use by MLU1 424.

As can be seen from FIGS. 4A-4D, write requests may be accepted for any region of an MLU address range in any order and storage may be allocated in a real time fashion on the fly. This storage allocation may be both cyclical with respect to the storage array and synchronous with respect to the write cycles, thereby creating a cyclical-synchronous allocation of the storage pool. For example, for data write operations, an MLU may cycle through the data storage extent pool and allocate data storage extents required by the write operation. As storage blocks are deleted from MLU definitions, they may be returned to the pool for re-allocation on the next allocation cycle through the pool.

Again, it should be noted that the block pointers at the first level of an MLU definition may point to other levels of block pointers rather then pointing directly to storage blocks. In this way, the address range of MLUs may be expanded either at the time of creation or may be dynamically grown or reduced as needed. In order to keep the logical address space of the MLU contiguous, for a single growth level (e.g., adding just one more block of pointers to an MLU definition), it may be practical to allocate the last block in the storage pointer array as a pointer to another storage pointer array. This technique may be continued to create a multi-layered storage pointer structure. This may continue until the desired addressability is achieved, within the scope of allocable storage space within the data pool. As described above, the address space may be fixed for MLUs and a multi-level set of arrays of pointers may be used to reference the desired logical address range. Again, the number of pointers used may be based upon the storage extent size multiplied by the number of storage pointers needed to reference the address range.

Another benefit of this architecture is the compact storage relationship that may be used for making point-in-time copies of a storage range referenced by an MLU. A point-in-time copy may be made by simply copying the MLU definition (e.g., the top level pointer).

Figure 5A:
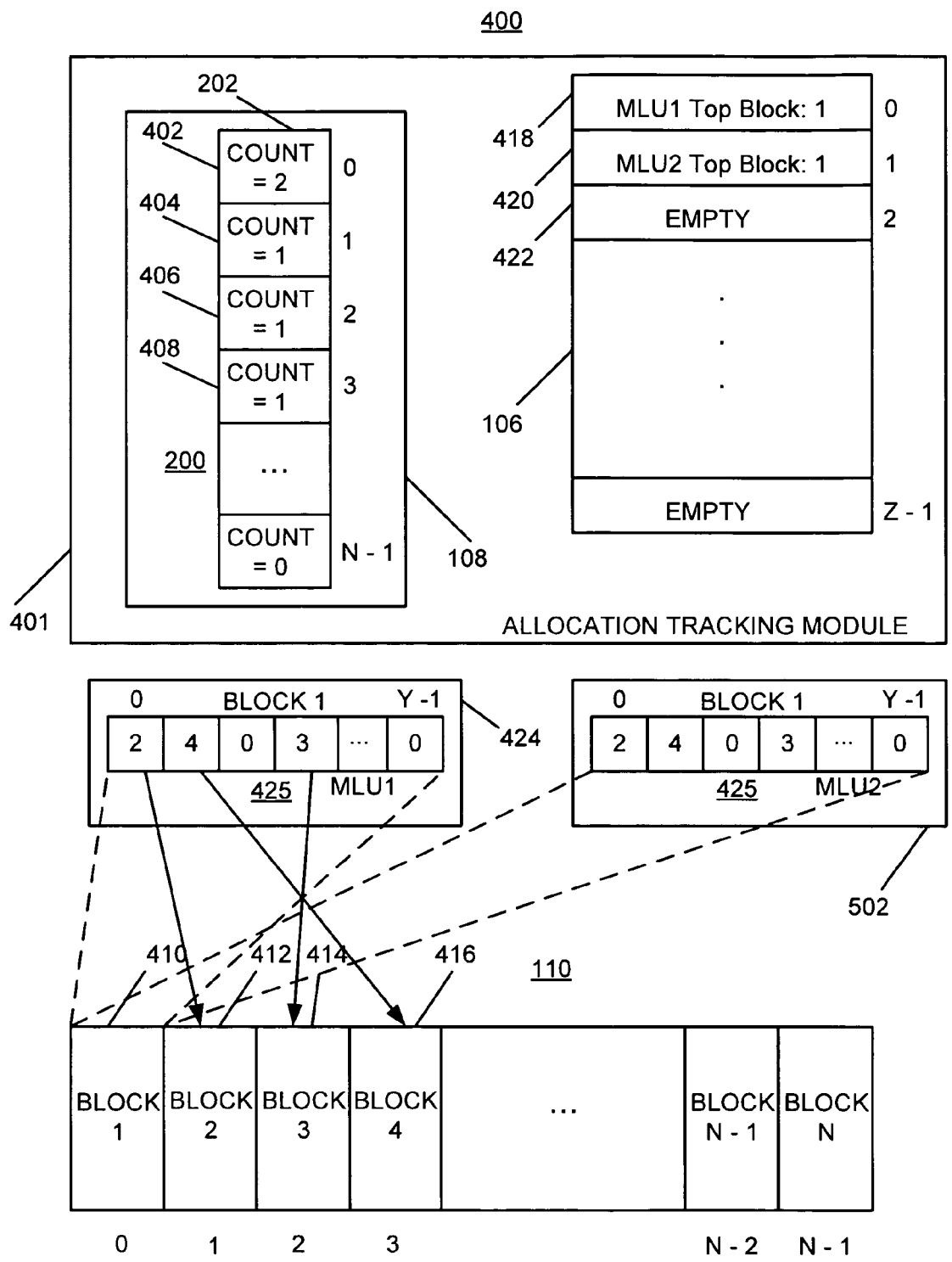
FIG. 5A is a block diagram of an exemplary dynamic allocation system of moderate size and granularity for dynamically allocating storage extents from a storage extent pool after one point-in-time copy has been made and a second MLU has been created according to an embodiment of the subject matter described herein.
Figure 5B:
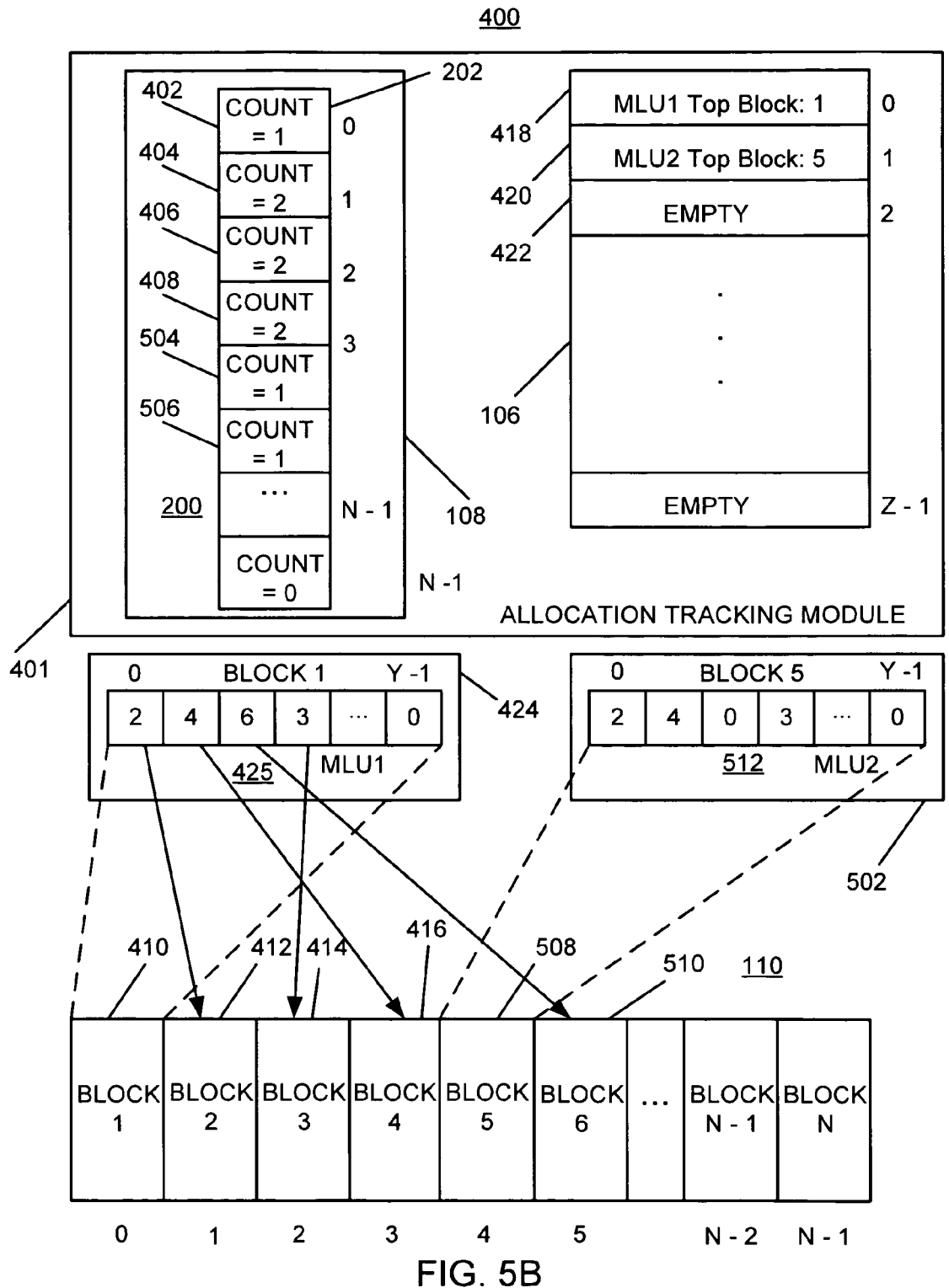
FIG. 5B is a block diagram of an exemplary dynamic allocation system of moderate size and granularity for dynamically allocating storage extents from a storage extent pool after a data write to the address space of the original MLU, MLU1, according to an embodiment of the subject matter described herein.

FIGS. 5A-5B further illustrate dynamic allocation system 400 after one point-in-time copy of an MLU has been made and data has been subsequently written to a portion of the shared address range. FIG. 5A represents dynamic allocation system 400 after a second MLU has been created. MLU definition entry 420 shows that MLU2 502 has been created. In the illustrated example, MLU2 502 has been created as a copy of MLU1 424 without allocation of a storage extent other than those previously allocated by MLU1 424 and by simply pointing to the top-level block structure pointer 425 (pointing to block 1) of MLU1 424. The allocation count field in entry 402 of allocation tracking area 108 has been updated to indicate that two MLUs now reference this top block (block 1). No other data storage has been copied. This point-in-time copy is compact and allows for multiple point-in-time copies to be generated in a small storage space, thereby allowing an increased granularity in the point-in-time backup mechanism. By reusing the physical storage blocks for the point-in-time copy, storage reuse has been improved for facilities such as data backup and recovery points, and related tasks. The ability to copy an MLU by copying the top block, (e.g., making point-in-time copies with little overhead in this fashion) shall be termed herein as virtualization. Virtualization allows for a reduced storage requirement for MLU copies.

FIG. 5B illustrates dynamic allocation system 400 after a data write to the address space of the original MLU, MLU1 424, which is now a shared address space with MLU2 502. The address range for this write operation is assumed to be the third block in the address range of MLU1 424 (e.g., byte ranges 131,071-196,607). As can be seen from FIG. 5B, entries 504 and 506 have been populated in allocation tracking area 108 to accommodate the write and no longer hold default values. Because MLU2 502 is a point-in-time backup, no write operations will be performed to the physical address space referenced by MLU2 502 in order to preserve the point-in-time copy. The write to the shared address space of MLU1 424 and MLU2 502 may be accomplished by allocation of two data blocks 508 and 510.

Data block 508 may be allocated and used to store the original pointer data of MLU1 424 as the point-in-time reference pointer for MLU2 502, represented in the FIG. 5B with storage extent pointer structure 512 stored in storage extent 508 (block 5). Because only one MLU references the respective data pool block, the allocation count field 202 of entry 504 has been set to one (1).

Data block 510 may be allocated and used to store the written data. Because only one MLU references the respective data pool block, the allocation count field 202 of entry 506 has been set to one (1).

MLU1 424 may change overtime while preserving the data state of that point-in-time copy by allocating new blocks as new data is written to its address space. MLU1 424 has become a derived MLU, derived from the original set of storage blocks with additional blocks allocated to store the changes and is now a child of MLU2 502. MLU2 502 has become the parent of MLU1 424 and holds a reference point from which changes to its child, MLU1 424, have been and will be performed. The allocation count field 202 of row 402 has been decremented to show that only one MLU, MLU2 502, now references block 1, which stores the original storage pointer structure 425, now referenced as storage pointer structure 512.

The definition of MLU2 502 has been changed to reflect that it now points to a new block 5 (e.g., storage extent 508 of a data pool 110). This has been reflected in MLU definition area 106 at MLU definition entry 420. Storage pointer structure 425 of MLU1 424 now points to all of the original data pool blocks and has a new entry for block 6 (e.g., storage extent 510) for the address range represented by the write operation.

As may be seen from the above description, multiple point-in-time copies may be made with very little overhead and may be preserved without extensive new memory allocations. The point-in-time copy may become the owner of shared blocks upon a new write operation that changes the original MLU definition, thereby, obviating a need to allocate entirely new sets of storage blocks for storage of point-in-time copies. Other blocks may remain shared blocks until new writes to the shared blocks occur, and new allocations may be made at the time storage is needed rather than at the time of the point-in-time copy. By referencing the shared blocks with a multiple allocation count, a write to the address space of a child, for example MLU1 424, may allow MLU1 424 to recognize that it should allocate a new block when a write operation occurs to any of its address space. In this way, dynamic storage allocation may continue for many more point-in-time copies and with similarly compact representations. Similar transformations of storage space may be performed when data has been deleted from an MLU address range. Upon return of a data block to the pool, the associated allocation tracking fields may be returned to a default state and the block made available for new allocation on the next round of block allocations from the pool. As described above, a cyclical-synchronous allocation may be performed on the pool. As well, any other allocation mechanism for allocating discontiguous blocks of storage from a storage pool may be performed and all are considered within the scope of this disclosure.

Entire replicas of MLUs are also possible by allocation of sufficient new storage blocks to store all physical data associated with an MLU, including its pointer structures, and by changing the contents of the copied pointer structures to point to the respective copies of the storage extents. In this way, replicas may be made without any shared blocks. Replicas may be used for either local or remote archival of MLUs, including the associated data pointers, and for more enhanced recovery mechanisms. Replicas may also be used to create complete system state backup copies of MLU pool data. When a replica is made to an entirely different address space, the replica may be thought of as a facsimile, whether in the same or a different pool. When a facsimile is made to a different fault domain, it may be thought of as a complete clone of the original MLU.

The system described in FIGS. 4A-4D and 5A-5B represent a basic system capable of performing the functionality as described herein for a system of moderate size and granularity. Multiple layers of pointers may be used to expand the address space of an MLU. Accordingly, any and all pointer mechanisms capable of identifying storage locations in a storage pool are considered within the scope of the subject matter described herein.

Figure 6A:
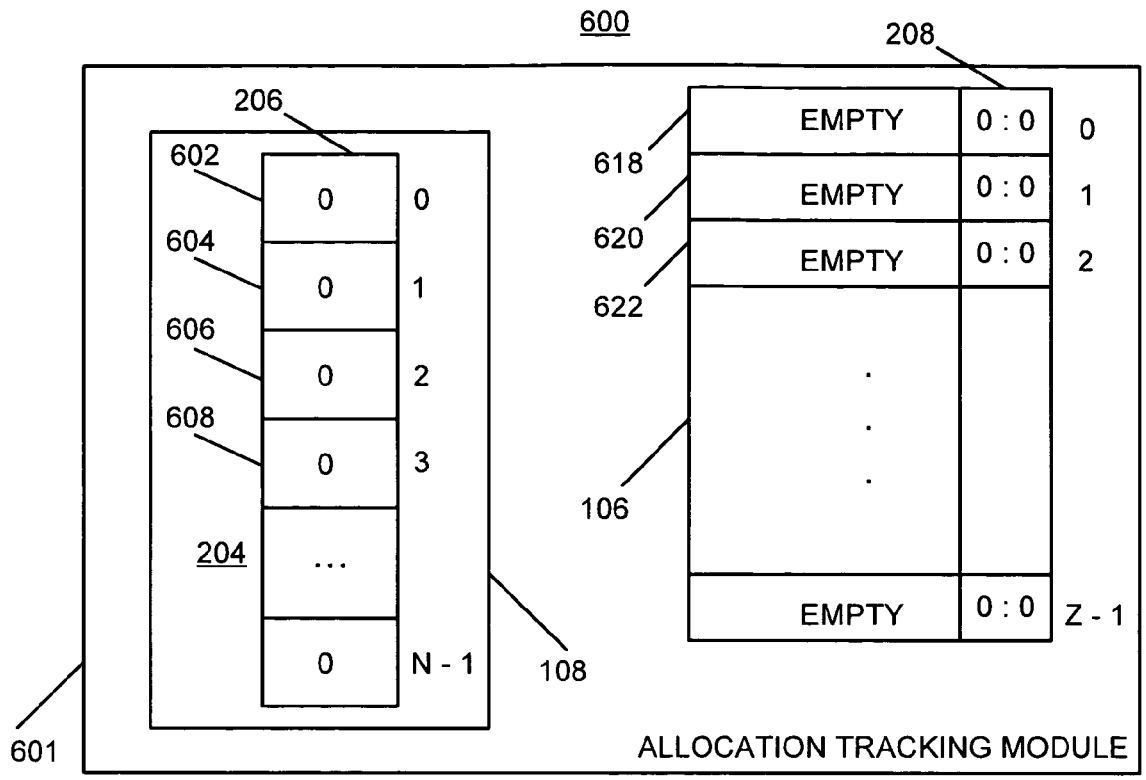
FIG. 6A is a block diagram of an exemplary dynamic allocation system of large size and high granularity for dynamically allocating storage extents from a storage extent pool in an initial state prior to creation of any MLUs and wherein no blocks have been allocated and tracking structures are not yet occupied according to an embodiment of the subject matter described herein.
Figure 6A:
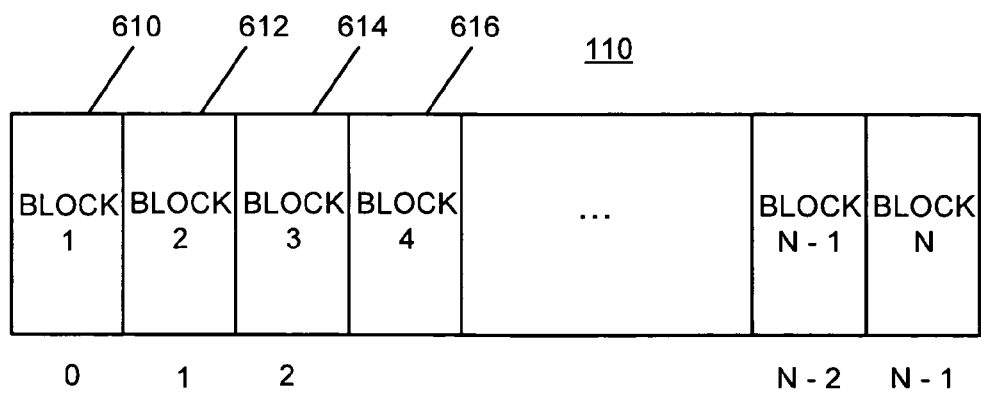

FIGS. 6A-6D illustrate exemplary dynamic allocation system 600 representing a large, highly granular system for dynamically allocating storage extents from a storage extent pool. Exemplary dynamic allocation system 600 is based upon exemplary dynamic allocation system 300 for the case of a large, highly granular system. FIG. 6A depicts an initial state for this system, wherein, prior to creation of any MLUs, no blocks have been allocated and the tracking structures are not yet occupied with active data. Allocation tracking module 601, is based upon allocation tracking module 301 with data structures, as described above and in more detail below, for a large, highly granular system. Allocation tracking module 601 references allocation tracking area 108, including an allocation tracking bitmap 204, partitioned into N segments, indexed as zero (0) to N minus one (N−1). As can be seen from FIG. 6A, columns of allocation bit fields 206 indicate that all storage extents in data storage pool 110 are free, as indicated by a zero in each allocation bit field 206. The rows of allocation tracking bitmap 204 represent individual entries in the tracking structure. Rows 602, 604, 606 and 608 represent tracking structure entries, each of which includes an allocation bit field 206.

Data storage pool 110 is represented with the same number N storage extents of equal size. For illustrative purposes, each storage extent will be considered to be 64K bytes in size (65,536 bytes of storage space). Storage extents 610, 612, 614 and 616 represent storage extents for blocks 1 through 4, respectively.

In FIG. 6A, MLU definition area 106 includes Z segments of MLU definition identifiers that may be used to identify MLUs when they are created. These identifiers may include attributes for identifying blocks (block pointers) within data storage pool 110. Again, the initial state of dynamic allocation system 600 has no MLUs defined, which is depicted by the identifier "EMPTY" in each MLU definition entry. MLU definition entries 618, 620 and 622 represent the entries at indexes zero (0), one (1) and two (2) respectively, each including a dynamic allocation tracking storage extent numbering structure 208. For ease of presentation, as described above, dynamic allocation tracking storage extent numbering structures 208 are shown with owner bit field 212 and storage extent number field 210 as colon-separated pairs. Owner bit field 212 and storage extent number field 210 are colon-separated fields, as described above, so that the owner bit field 212 is the highest order number and the storage extent number field 210 is the lowest order number (e.g., 0:0 for the case of no owner of storage extent zero).

Figure 6B:
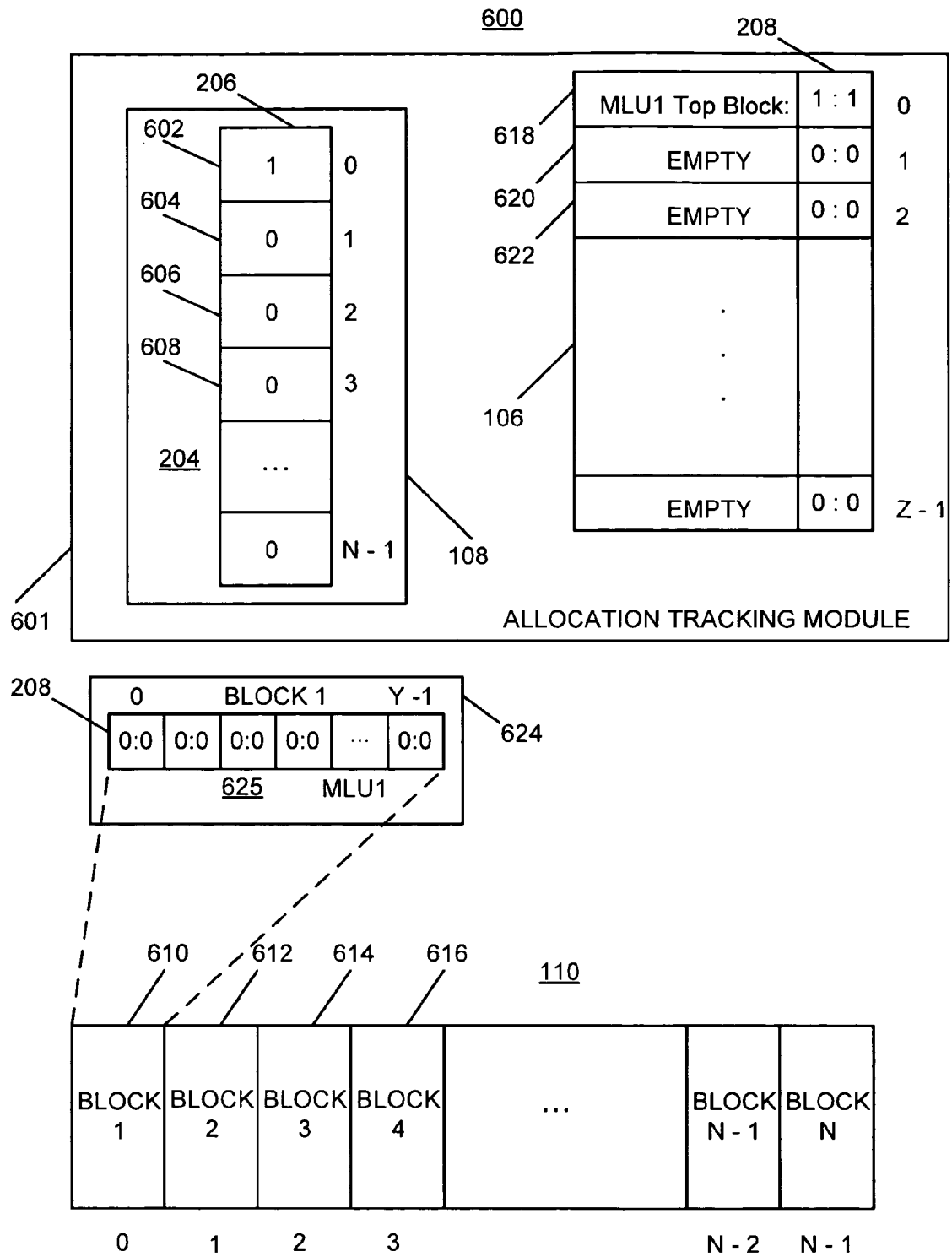
FIG. 6B is a block diagram of an exemplary dynamic allocation system of large size and high granularity for dynamically allocating storage extents from a storage extent pool after one MLU has been created according to an embodiment of the subject matter described herein.

FIG. 6B illustrates dynamic allocation system 600 after one MLU has been created. MLU1 624 is shown registered in MLU definition entry 618. MLU definition entry 618 points to block one (1) 610 of data storage pool 110, as represented by the designators, as described above, in the associated dynamic allocation tracking storage extent numbering structure 208 (e.g., 1:1) to show that MLU1 624 is the owner of block one (1). Allocation tracking bitmap 204 row 602 has been modified to reflect that the respective storage extent (block 1 610 at index zero of data storage pool 110) is used by an indication of one (1) in allocation bit field 206.

MLU1 624 includes a storage pointer structure 625 stored in block 1 610 and representing the storage address range for MLU1 624. The entries within storage pointer structure 625 represent Y storage pointers that may be used to point to storage extents, indexed from zero (0) to Y minus one (Y−1). The storage pointers used in dynamic allocation system 600 differ from those used in dynamic storage system 400. In dynamic allocation system 600, allocation tracking storage extent numbering structures 208 are used instead of storage extent pointers of other embodiments. The allocation tracking storage extent numbering structures 208 each include owner bit field 212 and storage extent number field 210.

Each allocation tracking storage extent numbering structure 208 storage extent number field 210 initially points to zero, indicating that reads from the MLU address range initially return a value of zero. The owner bit fields 212 are initially set to zero (0) to indicate that no storage extents have been allocated, and accordingly, are not owned by any MLU1 624. In the illustrated example, entries within pointer structure 625 that include non-zero values point to storage extents allocated by MLU 624. As described above, these storage extents may be allocated when an application performs a write operation. The maximum address range of the MLU may be represented by the number of pointers, Y, provided within the storage pointer structure 625 multiplied by the storage extent size that may be referenced by each pointer.

Each pointer within storage pointer structure 625 may, instead of including allocation tracking storage extent numbering structures 208, point to other storage extents that may each include other storage extent pointers. The may continue until enough storage pointers may be referenced to fully occupy the desired address range for an application with the last entries including allocation tracking storage extent numbering structures 208. Accordingly, a multi-layered storage pointer array system is possible, thereby allowing scalability of MLU address ranges, either at MLU creation or over time.

In order to determine whether a multi-layered storage pointer array should be used, the desired address space for the application should be divided by the size of the storage extents or ALUs to be allocated from within the pool to yield the number of storage extent pointers to be used. The number of storage extents that should be allocated for storage of the storage extent pointers may be determined by dividing the number of storage pointers by the number of storage pointers that may be stored in one storage extent to yield the number of storage extents to be used to store the pointers. The number of storage extent pointers that may be stored within a storage extent is a function of the storage extent size divided by the pointer size. When the number of storage pointers exceeds the capacity of one storage extent to hold them all, an additional number of storage extents may be used to create a multi-layered storage pointer array. For simplicity of description, only one layer is represented in FIG. 6A-6D.

Figure 6C:
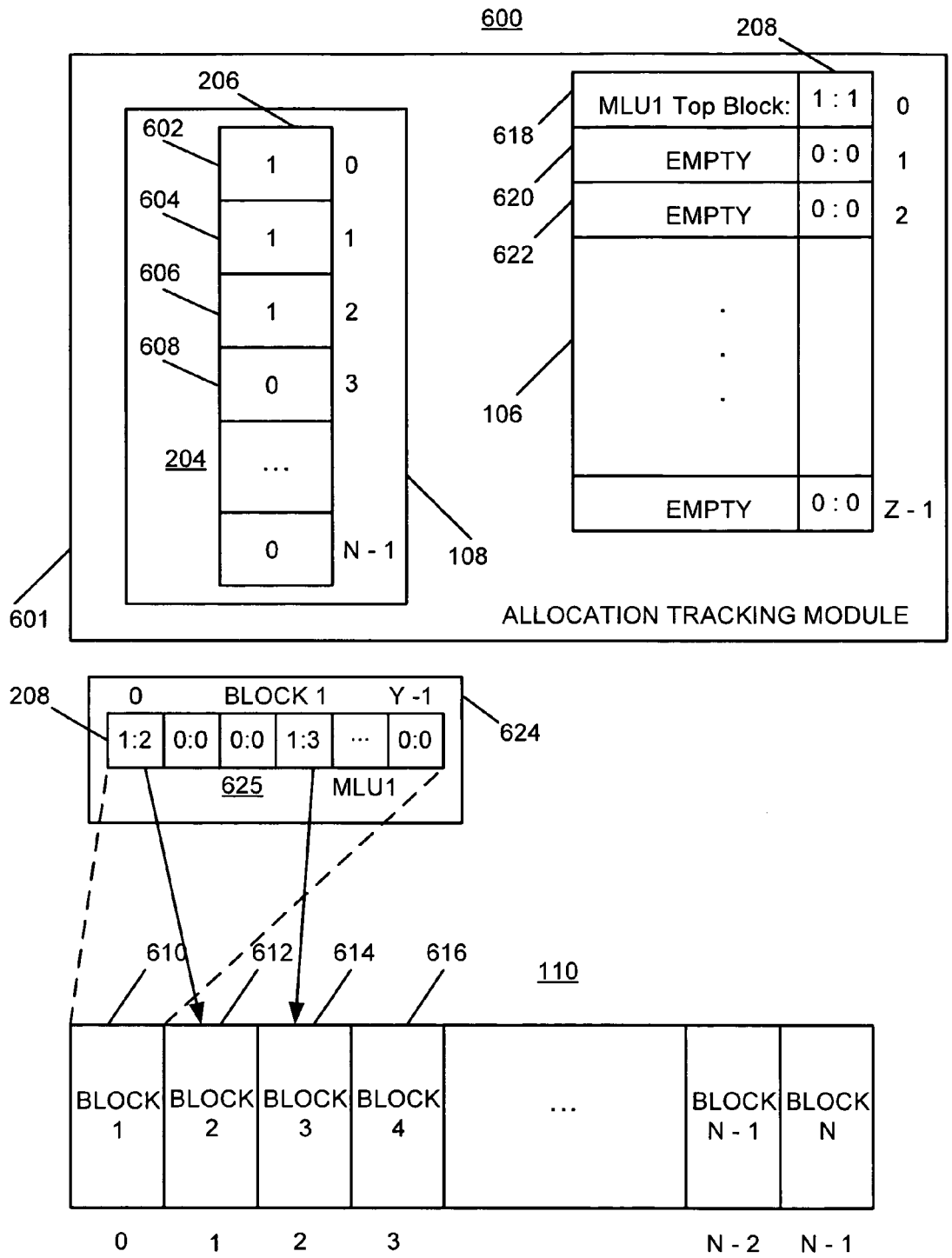
FIG. 6C is a block diagram of an exemplary dynamic allocation system of large size and high granularity for dynamically allocating storage extents from a storage extent pool after two write requests have been completed for a first MLU according to an embodiment of the subject matter described herein.

FIG. 6C illustrates dynamic allocation system 600 after two write request have been completed for MLU1 624. Recall that storage blocks may be allocated to the MLU when write requests are processed. For illustrative purposes and assuming byte addressability, the two write requests will be assumed to have been to the first and fourth 64K address segments of the address range addressable by MLU1 624 (e.g., byte ranges 0-65,535, and 196,608-262,143, respectively).

As can be seen from FIG. 6C, storage extent 612 (block 2) and 614 (block 3) of data pool 110 have been allocated for storage of the written data. The first and fourth storage pointers of storage pointer structure 625 have been updated to point to storage extent 612 (block 2) and 614 (block 3), respectively, and to reflect the write operation to those contiguous storage ranges of the MLU definition. However, the data was placed at logically non-contiguous address ranges in the data pool. The unwritten address ranges in the address range of the MLU have not been propagated to the storage medium. The unwritten address ranges have been effectively removed from the storage requirement. Read from the addresses that have been written will return data from the data pool locations referenced by the pointers, while reads from non-written areas will return zero values without requiring storage allocation for this logical consistency.

FIG. 6C also illustrates the updating of allocation tracking bitmap 204 and dynamic allocation tracking storage extent numbering structures 208 to reflect the allocation of the two blocks from data pool 110. As can be seen from FIG. 4C, rows 604 and 606 have been updated to a one (1) to indicate that the respective blocks have been allocated. As can be seen from FIG. 6C, dynamic allocation tracking storage extent numbering structures 208 of storage pointer structure 625 at indexes zero (0) and three (3) have been updated to show that MLU1 624 is the owner of both block 2 (at index zero) and block (3) (at index three) by setting the owner bit fields 212 of each dynamic allocation tracking storage extent numbering structures 208 to a one (1) and the storage extent number fields 210 referenced by the pointers to blocks two (2) and three (3), respectively (e.g., 1:2 and 1:3).

Figure 6D:
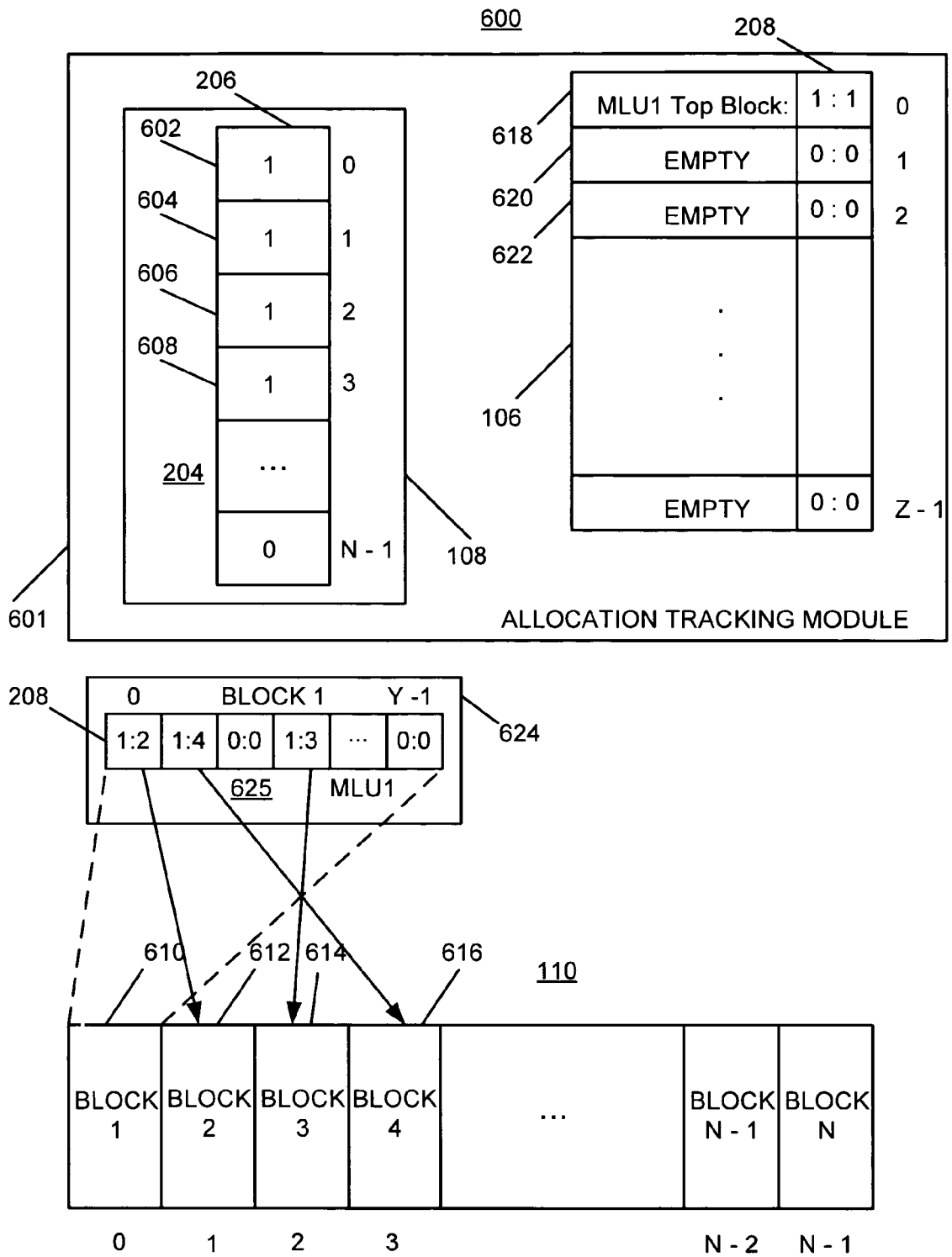
FIG. 6D is a block diagram of an exemplary dynamic allocation system of large size and high granularity for dynamically allocating storage extents from a storage extent pool after a third write request has been completed for the first MLU to an interim address range within the MLU definition according to an embodiment of the subject matter described herein.

FIG. 6D illustrates dynamic allocation system 600 after a third write request has been completed for MLU1 624 to an interim address range within the MLU definition. FIG. 6D reflects a write to the second 64K address segment of the address range addressable by MLU1 624 (e.g., byte ranges 65,536-131071). This write request allocated block 616 (e.g., block 4 of the storage pool at index 3) to MLU1 624. This is reflected by the updated storage pointer for this region (e.g., the second pointer) of the address range in storage pointer structure 625 which now reflects that block 616 (block 4 of the array) has been written for this address range of MLU1 624. As can be seen from FIG. 6D, dynamic allocation tracking storage extent numbering structures 208 of storage pointer structure 625 at index one (1) has been updated to show that MLU1 624 is the owner of both block 4 by setting owner bit field 212 of dynamic allocation tracking storage extent numbering structures 208 to a one (1) and storage extent number field 210 to block four (4) (e.g., 1:4). As can be seen from FIG. 6D, row 608 has been updated to reflect that the associated storage block is in use as indicated by a one (1).

As can be seen from FIGS. 6A-6D, write requests may be accepted for any region of an MLU address range in any order and storage may be allocated in a real time fashion on the fly. This storage allocation may be both cyclical with respect to the storage array and synchronous with respect to the write cycles, thereby creating a cyclical-synchronous allocation of the storage pool. As storage blocks are deleted from MLU definitions, they may be returned to the pool's cyclical-synchronous allocation mechanism for allocation on the next cycle of the pool for storage allocation.

Again, it should be noted that the block pointers at the first level of an MLU definition may point to other levels of block pointers rather then pointing directly to storage blocks. In this way, the address range of MLUs may be expanded either at the time of creation or may be dynamically grown or reduced as needed. In order to keep the logical address space of the MLU contiguous, for a single growth level (e.g., adding just one more block of pointers to an MLU definition), it may be practical to allocate the last block in the storage pointer array as a pointer to another storage pointer array. This technique may be continued to create a multi-layered storage pointer structure. This may continue until the desired addressability is achieved, within the scope of allocable storage space within the data pool. As described above, the address space may be fixed for MLUs and a multi-level set of arrays of pointers may be used to reference the desired logical address range. Again, the number of pointers used may be based upon the storage extent size multiplied by the number of storage pointers needed to reference the address range.

Another benefit of this architecture is the compact storage relationship that may be used for making point-in-time copies of a storage range referenced by an MLU. A point-in-time copy may be made by simply copying the MLU definition (e.g., the top level pointer).

Figure 7A:
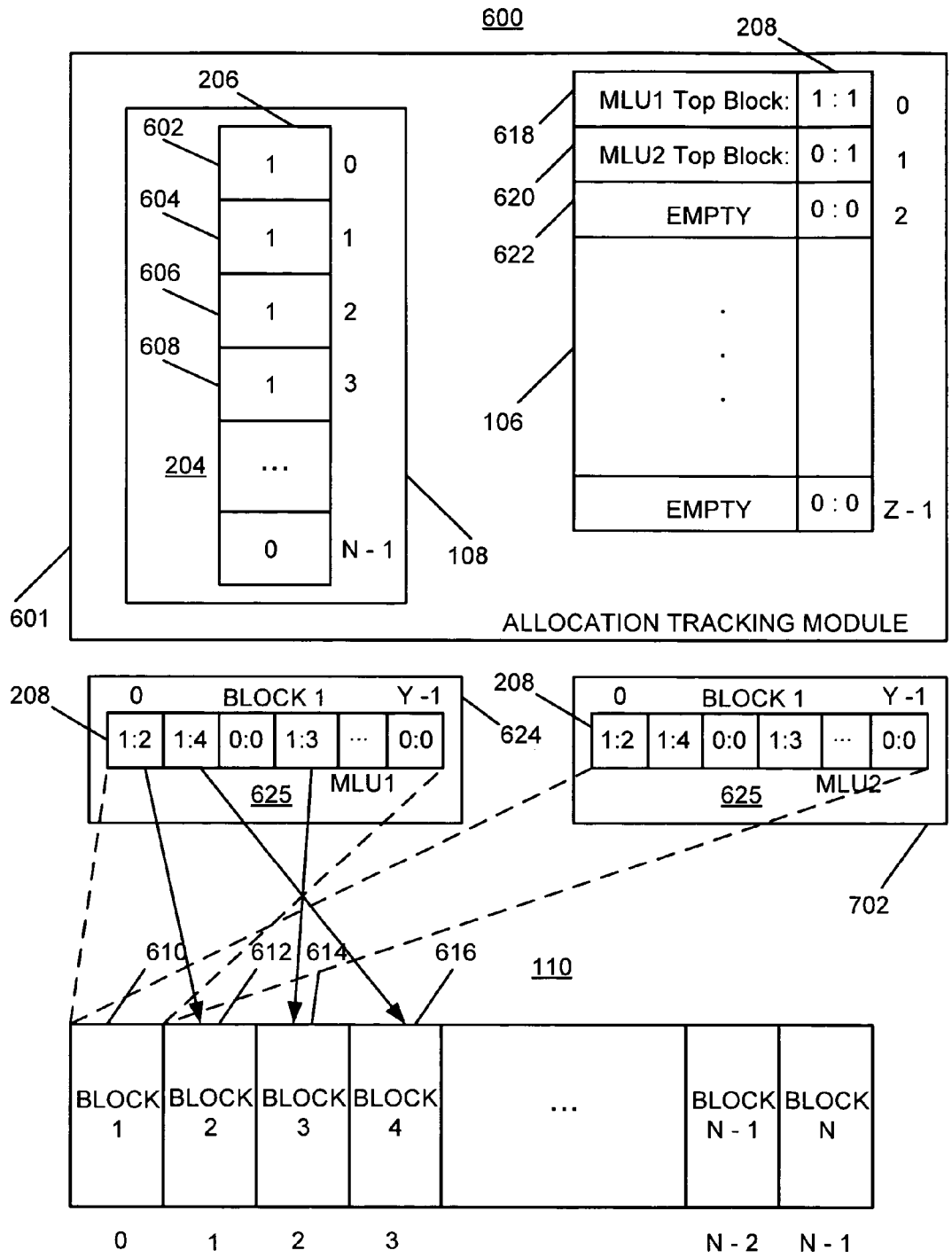
FIG. 7A is a block diagram of an exemplary dynamic allocation system of large size and high granularity for dynamically allocating storage extents from a storage extent pool after one point-in-time copy has been made and a second MLU has been created according to an embodiment of the subject matter described herein.
Figure 7B:
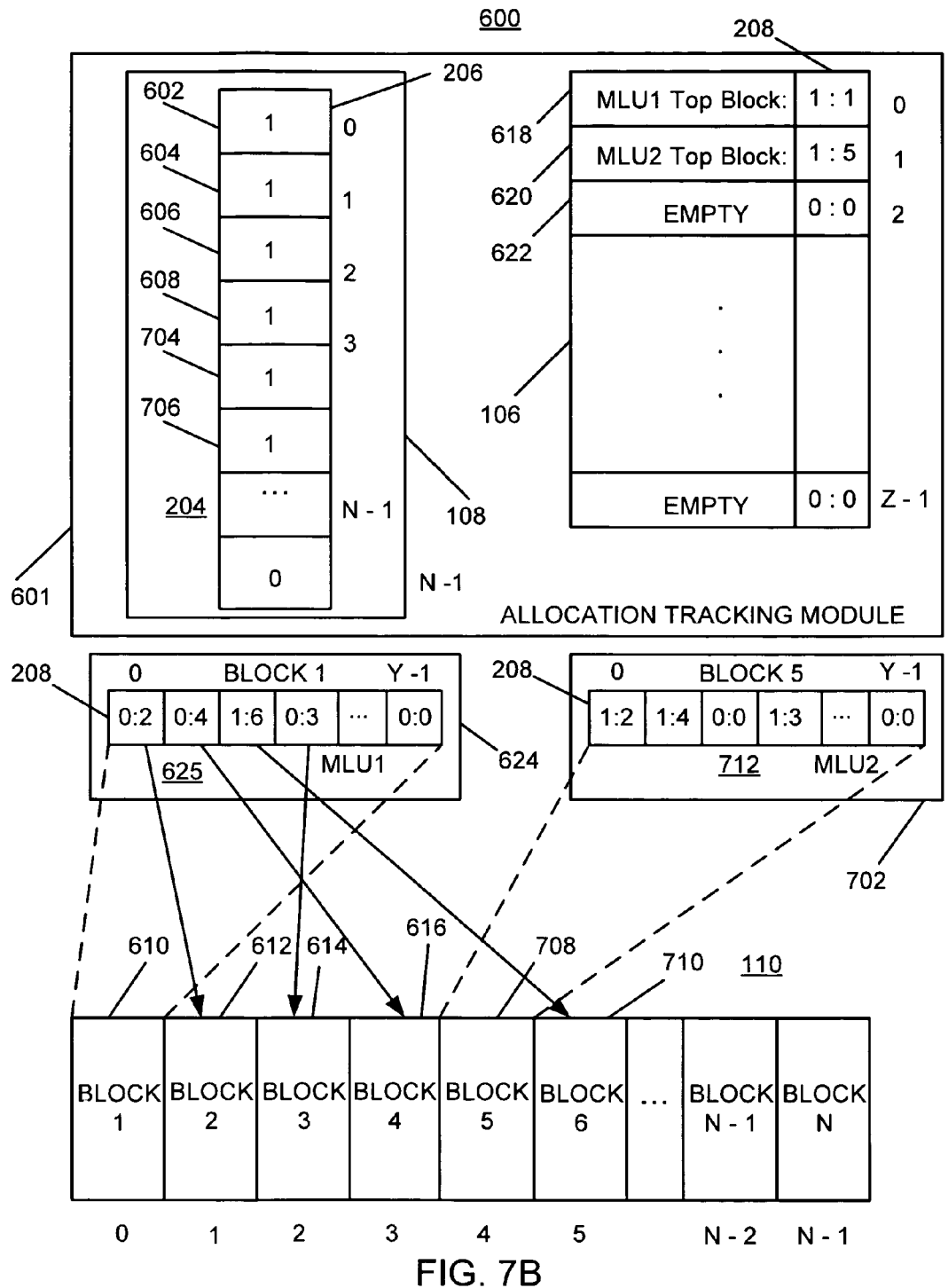
FIG. 7B is a block diagram of an exemplary dynamic allocation system of large size and high granularity for dynamically allocating storage extents from a storage extent pool after a data write to the address space of the original MLU, MLU1, according to an embodiment of the subject matter described herein.

FIGS. 7A-7B further illustrate dynamic allocation system 600 after one point-in-time copy of an MLU has been made and data has been subsequently written to a portion of the shared address range. FIG. 7A represents dynamic allocation system 600 after a second MLU has been created. MLU definition entry 620 shows that MLU2 702 has been created. In the illustrated example, MLU2 702 has been created as a copy of MLU1 624 without allocation of a storage extent other than those previously allocated by MLU1 624 and by simply pointing to the top-level block structure pointer 625 (pointing to block 1) of MLU1 624. MLU1 624 currently remains the owner of the blocks. Accordingly, dynamic allocation tracking storage extent numbering structure 208 at MLU definition entry 620 indicates that MLU2 702 is not the owner by setting owner bit field 212 to a zero (0) and setting storage extent number field 210 to point to block one (1) (e.g., 0:1).

Ownership of the blocks originally allocated by MLU1 624 does not yet need to change because MLU2 702 is simply referencing the same pointer used by MLU1 624. As will be described below, ownership may change when any data is written to the address space referenced by both MLU1 624 and MLU2 702.

It should be noted that no other data storage has been copied to create this point-in-time copy. This point-in-time copy is compact and allows for multiple point-in-time copies to be generated in a small storage space, thereby allowing an increased granularity in the point-in-time backup mechanism. By reusing the physical storage blocks for the point-in-time copy, storage reuse has been improved for facilities such as data backup and recovery points, and related tasks. As described above, the ability to copy an MLU by copying the top block, (e.g., making point-in-time copies with little overhead in this fashion) shall be termed herein as virtualization. Virtualization allows for a reduced storage requirement for MLU copies.

FIG. 7B illustrates dynamic allocation system 600 after a data write to the address space of the original MLU, MLU1 624, which is now a shared address space with MLU2 702. The address range for this write operation is assumed to be the third block in the address range of MLU1 624 (e.g., byte ranges 131,071-196,607). As can be seen from FIG. 7B, entries 704 and 706 have been populated in allocation tracking bitmap 204 to accommodate the write and no longer hold default values. Because MLU2 702 is a point-in-time backup, no write operations will be performed to the physical address space referenced by MLU2 702 in order to preserve the point-in-time copy. The write to the shared address space of MLU1 624 and MLU2 702 may be accomplished by allocation of two data blocks 708 and 710.

Data block 708 may be allocated and used to store the original pointer data of MLU1 624 as the point-in-time reference pointer for MLU2 702, represented in FIG. 7B with storage extent pointer structure 712 stored in storage extent 708 (block 5). The definition of MLU2 702 has been changed to reflect that MLU2 702 is the owner of this block (e.g., block 5) by setting owner bit field 212 to a one (1) and setting storage extent number field 210 to point to block five (5) (e.g., 1:5) within MLU definition entry 620. This allocation of block five (5) may be used as a trigger for ownership change, as will be described below.

Data block 710 may be allocated and used to store the written data. MLU1 624 may be designated as the owner of this block by setting owner bit field 212 to a one (1) and setting storage extent number field 210 to point to block six (6) (e.g., 1:6) at index two (2) within block structure pointer 625. Storage pointer structure 625 of MLU1 624 now points to all of the original data pool blocks and has a new entry for block 6 (e.g., storage extent 710) for the address range represented by the write operation.

However, as described above, the allocation of block five (5) may be used as a trigger for ownership change. MLU1 624 is no longer the owner of the data pool blocks originally allocated to it. Ownership has changed for these remaining blocks to the point-in-time backup to allow the original MLU, MLU1 624, to change over time while preserving the data state of that point-in-time copy. Accordingly, for the originally allocated blocks, the ownership has changed to the point-in-time copy, which is MLU2 702, as reflected within block structure pointer 625 by setting owner bit fields 212 to a zero (0) for dynamic allocation tracking storage extent numbering structures 208 at indexes zero (0), one (1), and three (3) (e.g., 0:2 at index zero, 0:4 at index one, and 0:3 at index three). This ownership change can also be seen within block structure pointer 712 by setting owner bit fields 212 to a one (1) for dynamic allocation tracking storage extent numbering structures 208 at indexes zero (0), one (1), and three (3) (e.g., 1:2 at index zero, 1:4 at index one, and 1:3 at index three).

MLU1 624 has become a derived MLU, derived from the original set of storage blocks with additional blocks allocated to store the changes and is now a child of MLU2 702. MLU2 702 has become the parent of MLU1 624 and holds a reference point from which changes to its child, MLU1 624, have been and will be performed.

As can be seen from the above description, multiple point-in-time copies may be made with very little overhead and may be preserved without extensive new memory allocations. The point-in-time copy may become the owner of shared blocks upon a new write operation that changes the original MLU definition, thereby, obviating a need to allocate entirely new sets of storage blocks for storage of point-in-time copies. Other blocks may remain shared blocks until new writes to the shared blocks occur, and new allocations may be made at the time storage is needed rather than at the time of the point-in-time copy. In this way, dynamic storage allocation may continue for many more point-in-time copies and with similarly compact representations.

As described above, similar transformations of storage space may be performed when data has been deleted from an MLU address range. Upon return of a data block to the pool, the associated allocation tracking fields may be returned to a default state and the block made available for new allocation on the next round of block allocations from the pool. As described above, a cyclical-synchronous allocation may be performed on the pool. As well, any other allocation mechanism for allocating discontiguous blocks of storage from a storage pool may be performed and all are considered within the scope of this disclosure.

As described above, entire replicas of MLUs are also possible by allocation of sufficient new storage blocks to store all physical data associated with an MLU, including its pointer structures, and by changing the contents of the copied pointer structures to point to the respective copies of the storage extents. In this way, replicas may be made without any shared blocks. Replicas may be used for either local or remote archival of MLUs, including the associated data pointers, and for more enhanced recovery mechanisms. Replicas may also be used to create complete system state backup copies of MLU pool data. When a replica is made to an entirely different address space, the replica may be thought of as a facsimile, whether in the same or a different pool. When a facsimile is made to a different fault domain, it may be thought of as a complete clone of the original MLU.

The systems described in FIGS. 6A-6D and 7A-7B represent a basic system capable of performing the functionality as described herein for a large, highly granular system. Multiple layers of pointers may be used to expand the address space of an MLU. Accordingly, any and all pointer mechanisms capable of identifying storage locations in a storage pool are considered within the scope of the subject matter described herein.

Figure 8:
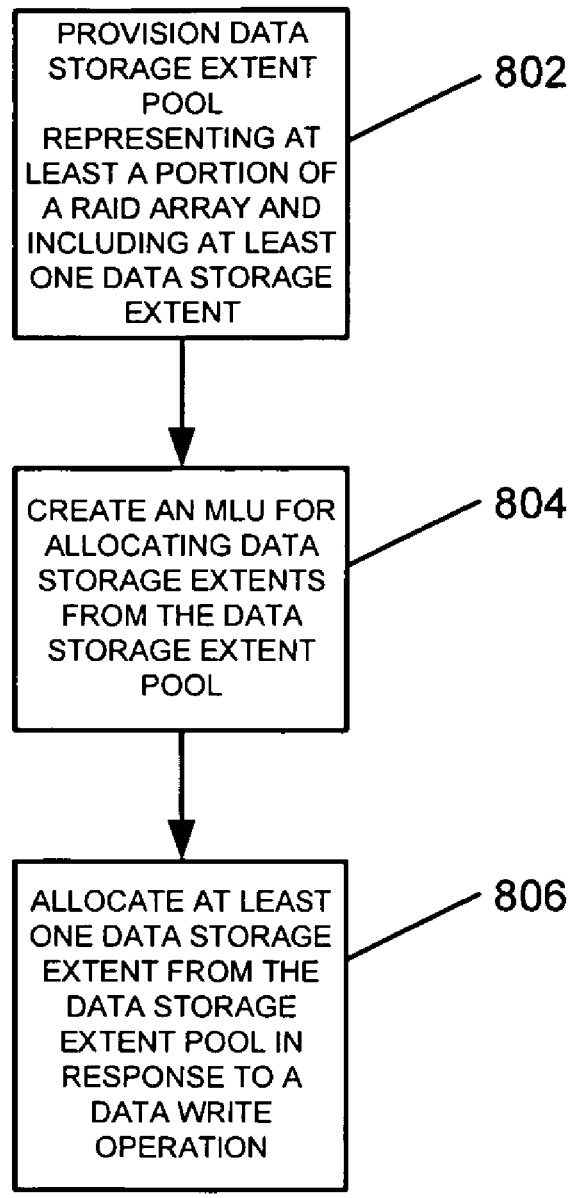
FIG. 8 is a flow chart illustrating exemplary steps by which dynamic mapping of logical unit (MLU) storage extents in a redundant array of inexpensive disks (RAID) environment may be performed according to an embodiment of the subject matter described herein.

FIG. 8 illustrates an exemplary dynamic MLU allocation process 800 for dynamic mapping of logical unit (LUN) storage extents in a redundant array of inexpensive disks (RAID) environment. At block 802, dynamic MLU allocation process 800 may provision a data storage extent pool representing at least a portion of a RAID array and including at least one data storage extent. Dynamic MLU allocation process 800 may create a first mapped logic unit (MLU) for allocating data storage extents from the data storage extent pool at block 804. At block 806, dynamic MLU allocation process 800 may allocate, in response to a data write operation, a first data storage extent from the data storage extent pool.

Figure 9:
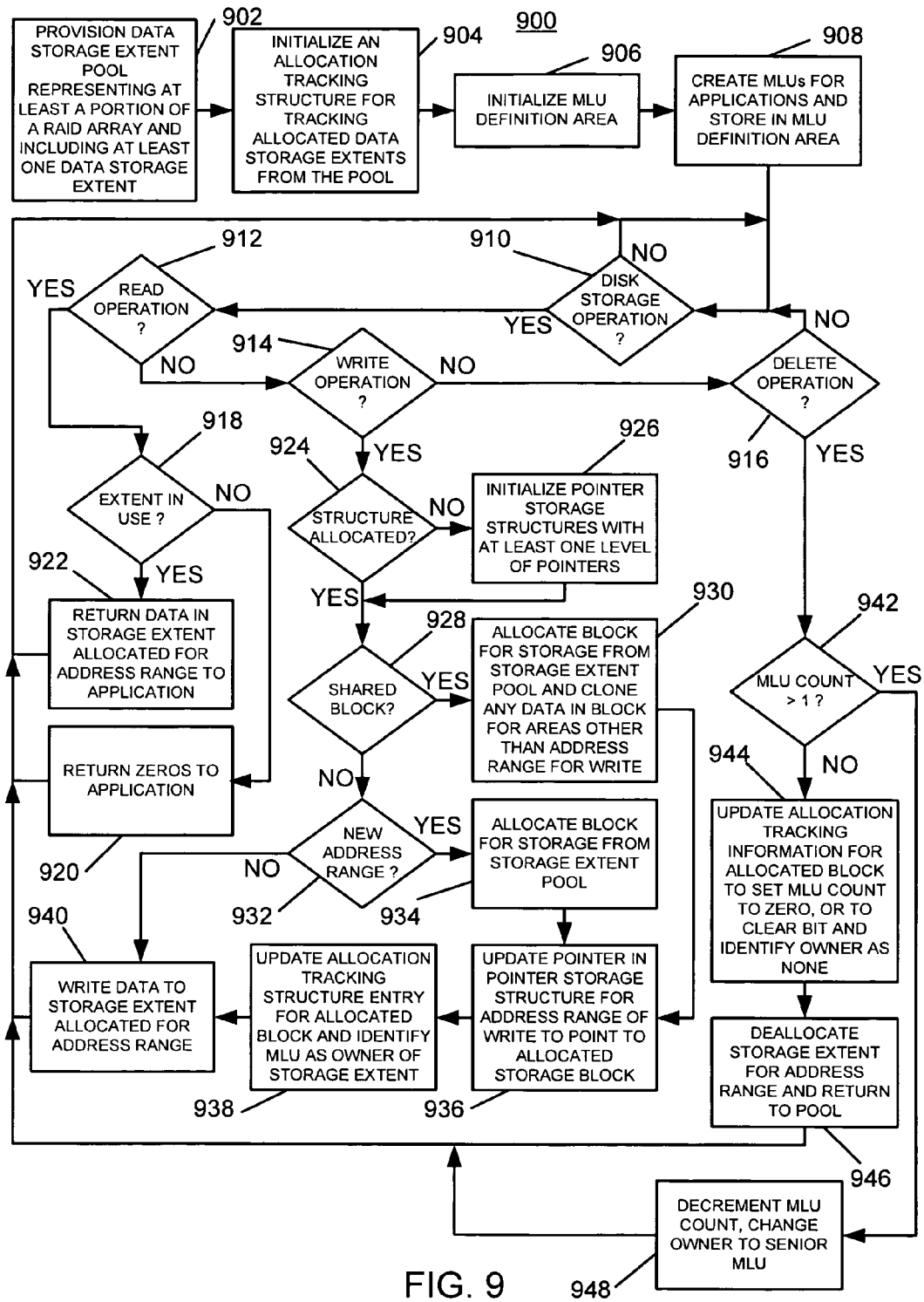
FIG. 9 is a flow chart illustrating exemplary steps by which dynamic mappings of logical unit (LUN) storage extents in a redundant array of inexpensive disks (RAID) environment in response to read, write, and delete operations for address ranges associated with the storage extents may be performed according to an embodiment of the subject matter described herein.

FIG. 9 illustrates an exemplary dynamic MLU allocation process 900 for dynamic mapping of logical unit (LUN) storage extents in a redundant array of inexpensive disks (RAID) environment in response to read, write, and delete operations for address ranges associated with the storage extents. At block 902, dynamic MLU allocation process 900 may provision a data storage extent pool representing at least a portion of a RAID array and including at least one data storage extent. As described above, the size of the data storage extent may be any size within a range of about two kilobytes up to the size of the data pool minus overhead.

At block 904, an allocation tracking structure for tracking allocated data storage extents from the pool may be initialized. As described above, the allocation tracking structure may vary depending upon the size and granularity of the system. FIGS. 4A-4D, 5A-5B, 6A-6D, and 7A-7B detail the available options for block 904. At block 906, an MLU definition area may be initialized, and at block 908, MLUs for applications may be created and stored in the MLU definition area. At the time of creation, an MLU may be either fully or thinly provisioned, as described above, by reservation of sufficient data storage extents for the entire address range represented within the MLU or by reserving fewer data storage extents, respectively.

At decision point 910, dynamic MLU allocation process 900 may wait for a disk storage operation for one of the applications and associated MLUs. When a disk operation has been received for a given MLU, the disk storage operation may be parsed at decision point 912 to determine if it is read operation, at decision point 914 to determine if it is a write operation, and at decision point 916 to determine if it is a delete operation. If the disk storage operation is an operation other than a read, write, or delete operation, dynamic MLU allocation process 900 may return to decision point code 910 to await new disk storage operations.

When the disk storage operation has been determined to be a read operation at decision point 912, dynamic MLU allocation process 900 may determine whether there is an associated data storage extent that is already in use for the address range associated with the read operation at decision point 918. If there is not a data storage extent in use and associated with the MLU for this application and read operation, dynamic MLU allocation process 900 may return zeros to the application for the read address range at block 920, and dynamic MLU allocation process 900 may return to block 910 to await another disk storage operation. If data has previously been written to the address range associated with the read operation, as will be described below, dynamic MLU allocation process 900 may return data stored in the storage extent allocated for the address range to the application at block 922.

When the disk storage operation has been determined to be a write operation at decision point 914, dynamic MLU allocation process 900 may determine whether a pointer storage structure with at least one level of pointers has previously been initialized for the MLU associated with the write operation at decision point 924. If a pointer storage structure with at least one level of pointers has not previously been initialized for the MLU, a pointer storage structure with at least one level of pointers may be initialized for the MLU associated with the write operation at block 926. As described above, the type of pointer storage structure allocated and initialized may vary depending upon the size and granularity of the system. FIGS. 4A-4D, 5A-5B, 6A-6D, and 7A-7B detail the available options for block 926. As described above, multiple levels of pointer structures are possible depending on the desired address range and the size selected for the data storage extents. As well, a single level of pointer structures may be sufficient when a data storage extent size allows all pointers for a given MLU to reside in one data storage extent. Other approaches to organizing data extent pointers are possible. Accordingly, any arrangement of data extent pointers is considered within the scope of this disclosure.

When a pointer storage structure with at least one level of pointers has previously been initialized for the MLU associated with the write operation, as determined at decision point 924, dynamic MLU allocation process 900 may determine whether the storage extent associated with the write operation is a shared block at decision point 928. As described above, there are instances where a storage extent may be shared between two MLUS. For example, when point-in-time copies are made, two MLUs reference the same shared storage extents. These two MLUs may diverge once new data is written to any of the shared physical storage extents. Accordingly, when the storage extent associated with the write operation is a shared block, as determined at decision point 928, a new storage extent may be allocated for the write operation from the storage extent pool and any data within the previously shared storage extent that is not associated with the write operation (e.g., for areas other than the address range for the write operation) may be cloned to the newly allocated storage extent at block 930.

When the storage extent is not a shared storage extent, as determined at decision point 928, dynamic MLU allocation process 900 may determine if this write is to a new address range at decision point 932. Dynamic MLU allocation process 900 may determine whether this is a new address range by reference to its hierarchical pointer storage structures, as described above. For example, a null pointer may be used to indicate that the address range associated with the write is a new address range. When a pointer is defined for the address range, dynamic MLU allocation process 900 may determine at decision point 932 that the address range associated with the write operation is not a new address range. The case where the address range associated with the write operation is not a new address range will be described below. For the case where the address range associated with the write operation is a new address range, as determined at decision point 932, dynamic MLU allocation process 900 may allocate a block for storage of the write data from the storage extent pool at block 934.

For either case described above for block 930 or for block 934, dynamic MLU allocation process 900 may update a pointer in the pointer storage structure for the address range of the write to point to the storage block that has been allocated at block 936,. As described above, the type of pointer storage structure allocated and updated may vary depending upon the size and granularity of the system. FIGS. 4A-4D, 5A-5B, 6A-6D, and 7A-7B detail the available options for block 936.

At block 938, the allocation tracking structure entry associated with the allocated block may be updated. This update may involve either incrementing a counter in an allocation tracking structure, or setting a bit in an allocation bit field and designating an owner for the storage extent, as described above. For a system where the concept of ownership is used, the MLU performing the write operation may be identified as the owner of the storage extent. As described above, the type of allocation tracking structure allocated and updated may vary depending upon the size and granularity of the system. FIGS. 4A-4D, 5A-5B, 6A-6D, and 7A-7B detail the available options for block 938.

For either the case described above for block 938 or for the case where the address range associated with the write operation is not a new address range, as determined at decision point 932 by a determination that a pointer other than a null pointer has been stored in a hierarchical pointer storage structure area associated with the address range for the write operation, dynamic MLU allocation process 900 may write data to the storage extent allocated for the address range at block 940 and may return to decision point 910 to await another disk storage operation.

When the disk storage operation has been determined to be a delete operation at decision point 916, the allocation tracking structure associated with the data storage extent for this address range may be examined to determine if the allocation tracking structure is of a type with a count field and whether the MLU count associated with this storage is greater than one (1) at decision point 942. As described above, the type of allocation tracking structure may vary depending upon the size and granularity of the system. FIGS. 4A-4D, 5A-5B, 6A-6D, and 7A-7B detail the available options at block 942. If the MLU count is not greater than one, dynamic MLU allocation process 900 may recognize that only one MLU has allocated the disk storage extent and that the storage extent is not a shared storage extent. Alternatively, when the type of allocation tracking structure is a bitmap, block 942 may be used to determine whether the associated bit is set to determine whether a block has previously been allocated. In either case, allocation tracking information for the allocated block may be updated by either setting the MLU count to zero or clearing the allocation bit for the storage extent, depending upon the type of allocation structure used, at block 944. At block 946, the storage extent for the address range may be deallocated and returned to the pool for new allocations, and dynamic MLU allocation process 900 may return to decision point 910 to await new disk storage operations. When the MLU count is determined to be greater than one at decision point 942, dynamic MLU allocation process 900 may recognize that more than one MLU has the associated data storage extent allocated and may decrement the MLU count. Dynamic MLU allocation process 900 may change the owner field to indicate that the MLU issuing the delete request is no longer the owner of the MLU by changing the owner to the new senior MLU or may decrement the MLU counter, depending upon the type of allocation tracking used, at block 948, and may return to decision point 910 to await new disk storage operations. As described above, the type of allocation tracking structure may vary depending upon the size and granularity of the system. FIGS. 4A-4D, 5A-5B, 6A-6D, and 7A-7B detail the available options at block 948.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for dynamic mapping of logical unit (LUN) storage extents in a redundant array of inexpensive disks (RAID) environment, the method comprising:
   (a) provisioning a data storage extent pool representing at least a portion of a RAID array and including at least one data storage extent;
   (b) creating a first mapped logic unit (MLU) for allocating, non-exclusively to the first MLU, data storage extents from the data storage extent pool; and
   (c) in response to a data write operation, allocating, using the first MLU, a first data storage extent from the data storage extent pool.

2. The method of claim 1 wherein creating the first MLU includes allocating a second data storage extent for use by the MLU and storing a first MLU definition in an MLU definition area including a first pointer to the second data storage extent allocated for use by the first MLU.

3. The method of claim 2 comprising storing, in the second data storage extent, a storage pointer structure that stores a plurality of storage extent pointers that point to non-contiguous data storage extents for address ranges accessible by the first MLU.

4. The method of claim 2 comprising storing, in the second data storage extent, a first storage pointer structure that stores a plurality of storage extent pointers that point to storage extents that each store a storage pointer structure that stores pointers that point to non-contiguous data storage extents for address ranges accessible by the first MLU.

5. The method of claim 2 comprising copying the first MLU to create a second MLU, wherein copying the first MLU includes creating a second MLU definition in the MLU definition area identical to the first MLU definition which includes the first pointer to the second data storage extent allocated for use by the first MLU, wherein the second data storage extent is shared by the first and second MLUs.

6. The method of claim 5 comprising allocating, in response to a second write operation to an address range associated with the first data storage extent, a third data storage extent, writing data to the third data storage extent, and promoting the second MLU to owner of the first data storage extent.

7. The method of claim 6 comprising updating a storage pointer structure of the first MLU to point to the third data storage extent for the address range associated with the second write operation.

8. The method of claim 1 comprising returning, in response to a data read operation, a zero value when the data read operation references an address range that has not previously been allocated.

9. The method of claim 1 comprising reserving, in the data storage extent pool, sufficient data storage extents for an entire address range available to the first MLU.

10. The method of claim 1 comprising reserving, in the data storage extent pool, fewer data storage extents than required for an entire address range available to the first MLU.

11. The method of claim 1 wherein the at least one data storage extent includes addressable space in a range from two kilobytes to a size of the data storage extent pool minus storage for overhead.

12. The method of claim 11 wherein the overhead includes pool metadata including data storage extent allocation information and MLU definition information.

13. The method of claim 11 wherein the overhead includes MLU metadata.

14. The method of claim 1 wherein allocating, in response to the data write operation, the first data storage extent from the data storage extent pool includes allocating the first data storage extent from at least one non-contiguous storage extent within the data storage extent pool.

15. The method of claim 1 wherein allocating, in response to the data write operation, the first data storage extent from the data storage extent pool includes cycling through the data storage extent pool and allocating data storage extents required by the write operation.

16. The method of claim 1 wherein allocating, in response to the data write operation, the first data storage extent from the data storage extent pool includes setting an identifier in an allocation tracking field associated with the first data storage extent to indicate that the first data storage extent has been allocated to the first MLU.

17. The method of claim 1 wherein allocating, in response to the data write operation, the first data storage extent from the data storage extent pool includes incrementing a counter in an allocation tracking count field associated with the first data storage extent to indicate that the first MLU references the first data storage extent.

18. The method of claim 1 wherein allocating, in response to the data write operation, the first data storage extent from the data storage extent pool includes updating an allocation tracking bit field associated with the first data storage extent to indicate that the first data storage extent has been allocated.

19. The method of claim 1 wherein allocating, in response to the data write operation, the first data storage extent from the data storage extent pool includes updating an allocation tracking owner field within the first MLU associated with the first data storage extent to indicate that the first MLU is the owner of the first data storage extent.

20. The method of claim 1 comprising writing data, in response to the data write operation, to the first data storage extent.

21. The method of claim 1 comprising deleting data, in response to a data delete operation, by moving the first data storage extent to a set of unallocated data storage extents of the data storage extent pool.

22. The method of claim 21 wherein deleting data, in response to the data delete operation, includes changing an identifier in an allocation tracking field to indicate that the first data storage extent has been deallocated by the first MLU.

23. The method of claim 21 wherein deleting data, in response to the data delete operation, includes decrementing a counter in an allocation tracking count field to indicate that the first data storage extent has been deallocated.

24. The method of claim 21 wherein deleting data, in response to the data delete operation, includes updating an allocation tracking bit field to indicate that the first data storage extent has been deallocated.

25. The method of claim 21 wherein deleting data, in response to the data delete operation, includes updating an allocation tracking owner field within the first MLU to indicate that the first MLU is not the owner of the first data storage extent.

26. A system for dynamic mapping of logical unit (LUN) storage extents in a redundant array of inexpensive disks (RAID) environment, the system comprising:
 (a) a data storage extent pool representing at least a portion of a RAID array and including at least one data storage extent;
 (b) a first mapped logic unit (MLU) for allocating, non-exclusively to the first MLU and in response to a data write operation, a first data storage extent from the data storage extent pool; and
 (c) an allocation tracking module for tracking allocation of data storage extents by the first MLU.

27. The system of claim 26 wherein the allocation tracking module is adapted to allocate a second data storage extent for use by the first MLU and store a first MLU definition in an MLU definition area including a first pointer to the second data storage extent allocated for use by the MLU.

28. The system of claim 27 wherein the pointer to the second data storage extent allocated for use by the first MLU includes a storage pointer structure that stores a plurality of data storage extent pointers that point to non-contiguous data storage extents for address ranges accessible by the first MLU.

29. The system of claim 27 wherein the pointer to the second data storage extent allocated for use by the first MLU includes a first storage pointer structure that stores a plurality of storage extent pointers that point to data storage extents that each store a storage pointer structure that stores pointers that point to non-contiguous data storage extents for address ranges accessible by the first MLU.

30. The system of claim 27 wherein the allocation tracking module is adapted to copy the MLU to create a second MLU by creating a second MLU definition in the MLU definition area identical to the first MLU definition which includes the first pointer to the second data storage extent allocated for use by the first MLU, wherein the second data storage extent is shared by the first and second MLUs.

31. The system of claim 30 wherein the allocation tracking module is adapted to, in response to a second write operation to an address range associated with the first data storage extent, allocate a third data storage extent, write data to the third data storage extent, and promote the second MLU to owner of the first data storage extent.

32. The system of claim 31 wherein the allocation tracking module is adapted to update a storage pointer structure of the first MLU to point to the third data storage extent for the address range associated with the second write operation.

33. The system of claim 26 wherein the first MLU is adapted to return a zero value in response to a data read operation when the data read operation references an address range that has not previously been allocated.

34. The system of claim 26 wherein the allocation tracking module is adapted to reserve sufficient data storage extents for an entire address range available to the first MLU.

35. The system of claim 26 wherein the allocation tracking module is adapted to reserve fewer data storage extents than required for an entire address range available to the first MLU.

36. The system of claim 26 wherein the at least one data storage extent includes addressable space in a range from two kilobytes to a size of the data storage extent pool minus storage for overhead.

37. The system of claim 35 wherein the overhead includes pool metadata including data storage extent allocation information and MLU definition information.

38. The system of claim 36 wherein the overhead includes MLU metadata.

39. The system of claim 26 wherein the first MLU is adapted to, in response to the data write operation, allocate the first data storage extent from at least one non-contiguous storage extent within the data storage extent pool.

40. The system of claim 26 wherein the first MLU is adapted to, in response to the data write operation, cycle through the data storage extent pool and allocate data storage extents required by the data write operation.

41. The system of claim 26 wherein the allocation tracking module is adapted to set an identifier in an allocation tracking field associated with the first data storage extent to indicate that the first data storage extent has been allocated for use by the first MLU.

42. The system of claim 26 wherein the allocation tracking module is adapted to incrementing a counter in an allocation tracking count field associated with the first data storage extent to indicate that the first MLU references the first data storage extent.

43. The system of claim 26 wherein the allocation tracking module is adapted to update an allocation tracking bit field associated with the first data storage extent to indicate that the first data storage extent has been allocated.

44. The system of claim 26 wherein the allocation tracking module is adapted to update an allocation tracking owner field within the first MLU associated with the first data storage extent with an identifier to indicate that the first MLU is the owner of the first data storage extent.

45. The system of claim 26 comprising wherein the MLU is adapted to write data, in response to the data write operation, to the first data storage extent.

46. The system of claim 26 wherein the first MLU is adapted to, in response to a data delete operation, delete data by moving the first data storage extent to a set of unallocated data storage extents of the data storage extent pool.

47. The system of claim 46 wherein the allocation tracking module is adapted to, in response to the data delete operation, change an identifier in an allocation tracking field to indicate that the first data storage extent has been deallocated.

48. The system of claim 46 wherein the allocation tracking module is adapted to, in response to the data delete operation, decrement a counter in an allocation tracking count field to indicate that the first data storage extent has been deallocated.

49. The system of claim 46 wherein allocating, in response to the data delete operation, update an allocation tracking bit field associated with the first data storage extent to indicate that the first data storage extent has been deallocated.

50. The system of claim 46 wherein the allocation tracking module is adapted to, in response to the data delete operation, update an allocation tracking owner field within the first MLU to indicate that the first MLU is not the owner of the first data storage extent.

51. A computer program product comprising computer-executable instructions embodied in a computer-readable medium for performing steps comprising:
(a) provisioning a data storage extent pool representing at least a portion of a RAID array and including at least one data storage extent;
(b) creating a first mapped logic unit (MLU) for allocating, non-exclusively to the first MLU, data storage extents from the data storage extent pool; and
(c) in response to a data write operation, allocating, using the first MLU, a first data storage extent from the data storage extent pool.

* * * * *